(12) United States Patent
Chin et al.

(10) Patent No.: US 12,489,362 B2
(45) Date of Patent: Dec. 2, 2025

(54) POWER SUPPLY APPARATUS AND TOTEM-POLE PFC CIRCUIT CONTROL METHOD

(71) Applicant: Huawei Digital Power Technologies Co., Ltd., Shenzhen (CN)

(72) Inventors: Ken Chin, Shenzhen (CN); Yuanjun Liu, Shenzhen (CN); Shanglin Mo, Dongguan (CN); Liangyun Kang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 142 days.

(21) Appl. No.: 18/497,110

(22) Filed: Oct. 30, 2023

(65) Prior Publication Data
US 2024/0072647 A1   Feb. 29, 2024

Related U.S. Application Data

(63) Continuation of application No. PCT/CN2021/091692, filed on Apr. 30, 2021.

(51) Int. Cl.
*H02M 1/42* (2007.01)
*H02M 3/158* (2006.01)

(52) U.S. Cl.
CPC ............. *H02M 1/42* (2013.01); *H02M 3/158* (2013.01)

(58) Field of Classification Search
CPC .................................. H02M 1/42; H02M 3/158
See application file for complete search history.

(56) References Cited

U.S. PATENT DOCUMENTS

| 9,654,024 B2 | 5/2017 | Cohen | |
|---|---|---|---|
| 2015/0180330 A1* | 6/2015 | Ye | H02M 1/4208 |
| | | | 363/126 |
| 2019/0305671 A1* | 10/2019 | Matsuura | H02M 1/083 |
| 2019/0319528 A1* | 10/2019 | Matsuura | H02M 1/083 |
| 2022/0209653 A1* | 6/2022 | Fu | H02M 1/0085 |

FOREIGN PATENT DOCUMENTS

| CN | 105393447 A | 3/2016 |
|---|---|---|
| CN | 104518656 B | 10/2018 |
| CN | 105874694 B | 4/2019 |
| CN | 109713918 A | 5/2019 |

* cited by examiner

*Primary Examiner* — Rafael O De Leon Domenech
(74) *Attorney, Agent, or Firm* — Maier & Maier, PLLC

(57) ABSTRACT

A power supply apparatus includes a totem-pole power factor correction (PFC) circuit and a control apparatus, and the totem-pole PFC circuit includes a first switching transistor and a second switching transistor. The control apparatus includes a controller and a dead time detection circuit, and the dead time detection circuit includes a detection capacitor and a detection resistor. A first end of the detection capacitor is connected to a first reference point, a second end of the detection capacitor is connected to a first end of the detection resistor, and a second end of the detection resistor is grounded. The controller is configured to, respectively, control an on/off status of the first switching transistor and an on/off status of the second switching transistor based on a voltage of the detection resistor and polarity of a voltage input by an alternating current input source.

19 Claims, 21 Drawing Sheets

----→ Charge current
------→ Discharge current

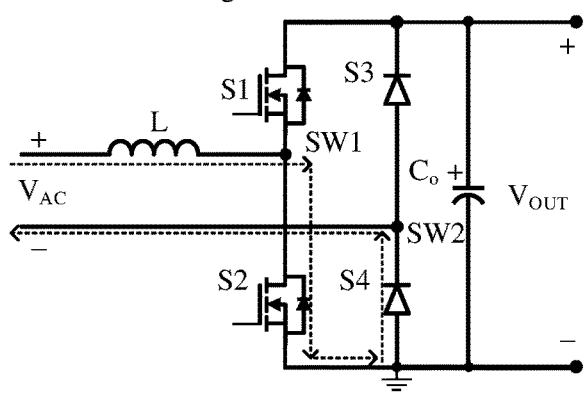# 
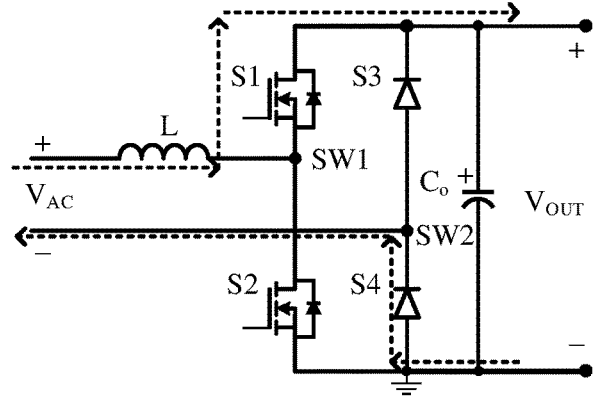

(a) An alternating current input source outputs a positive voltage, and the inductor L is charged (b) The alternating current input source outputs a positive voltage, and the inductor L is discharged

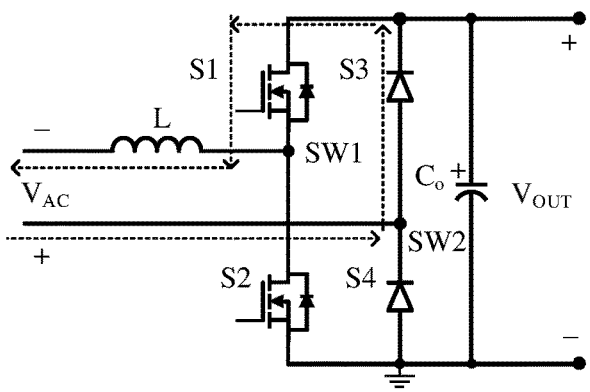
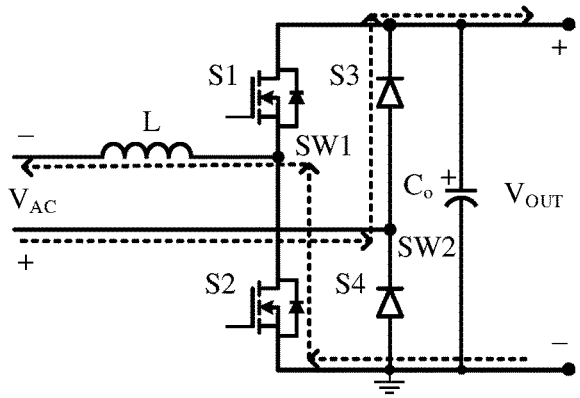

(c) The alternating current input source outputs a negative voltage, and the inductor L is charged (d) The alternating current input source outputs a negative voltage, and the inductor L is discharged

FIG. 1B

POWER SUPPLY APPARATUS AND TOTEM-POLE PFC CIRCUIT CONTROL METHOD

CROSS-REFERENCE TO RELATED APPLICATIONS

This application is a continuation of International Application No. PCT/CN2021/091692, filed on Apr. 30, 2021, the disclosure of which is hereby incorporated by reference in its entirety.

TECHNICAL FIELD

The embodiments relate to the field of electronic power converters and to a power supply apparatus and a totem-pole power factor correction (PFC) circuit control method.

BACKGROUND

A conventional power factor correction (PFC) circuit includes two stages: a rectifier bridge and a boost PFC circuit. Because there is a relatively large quantity of conduction components in the conventional PFC circuit, efficiency of the PFC circuit is reduced. However, a totem-pole PFC circuit can implement functions of rectification and PFC by using only one stage of conduction component. This can reduce a quantity of conduction components and improve efficiency.

FIG. 1A is a schematic diagram of a structure of a totem-pole PFC circuit. As shown in FIG. 1A, the totem-pole PFC circuit includes an alternating current input source, an inductor L, four switch components S1 to S4, an output filter capacitor COUT, and a load. S1 and S2 each may be a metal-oxide semiconductor field-effect transistor (MOSFET) or an insulated gate bipolar transistor (IGBT) made of a material such as a silicon (Si) semiconductor material or a third-generation wide band gap semiconductor material silicon carbide (SiC) or gallium nitride (GaN). S3 and S4 each may be a MOSFET, an IGBT, or a diode made of a material such as Si, SiC, or GaN.

An inductance current is controlled by controlling on/off statuses of S1 and S2 in the totem-pole PFC circuit, to control the entire totem-pole PFC circuit. FIG. 1B shows working statuses of the totem-pole PFC circuit in different on/off statuses. (a) and (b) in FIG. 1B are schematic working diagrams when a voltage $V_{AC}$ input by an alternating current input source is positive. In this case, S3 is turned off, S4 is turned on, S2 is turned on as a primary switch component to charge an inductor L, and S1 is turned on as a secondary switching transistor to discharge the inductor. (c) and (d) in FIG. 1B are schematic working diagrams when the voltage $V_{AC}$ input by the alternating current input source is negative. In this case, S3 is turned on, S4 is turned off, S1 is turned on as a primary switch component to charge the inductor, and S2 is turned on as a secondary switch component to discharge the inductor.

In a process in which S1 and S2 are alternately turned on, if S1 and S2 are turned on at the same time (a bridge arm is straight-through), a quite large short-circuit current is generated. Consequently, a component is damaged. Therefore, to avoid straight-through and meet a requirement of implementing a soft switch, an interval time (which is also referred to as a dead time) needs to be set in the process in which S1 and S2 are alternately turned on, to avoid straight-through. For the implementation of the soft switch, for example, after S1 is turned off, if S2 is turned on after a voltage at a series connection point SW1 between S1 and S2 is theoretically decreased to 0 V, zero-voltage switching of the switch S2 can be implemented. Refer to (a) in FIG. 1C. When a dead time is set to be excessively short, hard turn-on of S1 and S2 is caused. Refer to (b) in FIG. 1C. When a dead time is set to be excessively long, an electric energy loss is increased, power utilization is reduced, and a problem of hard turn-on is also caused.

Therefore, a dead time needs to be set to an appropriate value to achieve an optimal control effect on the totem-pole PFC circuit. However, because the voltage $V_{AC}$ input by the alternating current input source in the totem-pole PFC circuit is a sinusoidal alternating current voltage, speeds and time points at which a voltage at the point SW1 changes are different in dead times corresponding to different moments. In a conventional technology, optimal control cannot be performed on a totem-pole PFC circuit. In view of this, how to perform optimal control on the totem-pole PFC circuit needs to be urgently resolved by a person skilled in the art.

SUMMARY

The embodiments provide a power supply apparatus and a totem-pole power factor correction (PFC) circuit control method, to perform optimal control on a totem-pole PFC circuit.

According to a first aspect, the embodiments provide a power supply apparatus. The power supply apparatus includes a totem-pole power factor correction PFC circuit and a control apparatus, and the totem-pole PFC circuit includes a first switching transistor and a second switching transistor. A source of the first switching transistor and a drain of the second switching transistor are jointly connected to a first reference point, and a first input end of an alternating current input source is connected to the first reference point through an inductor. The control apparatus includes a controller and a dead time detection circuit, and the dead time detection circuit includes a detection capacitor and a detection resistor. A first end of the detection capacitor is connected to the first reference point, a second end of the detection capacitor is connected to a first end of the detection resistor, and a second end of the detection resistor is grounded. The controller is configured to: generate a first dead time control signal and a second dead time control signal based on a voltage of the detection resistor and polarity of a voltage input by the alternating current input source, control an on/off status of the first switching transistor based on the first dead time control signal, and control an on/off status of the second switching transistor based on the second dead time control signal. Based on the foregoing structure, the power supply apparatus can set an appropriate dead time for the switching transistors in the totem-pole PFC circuit to achieve an optimal control effect on the totem-pole PFC circuit.

In some possible implementations, the control apparatus further includes an alternating current input source polarity detection circuit, and the alternating current input source polarity detection circuit is configured to detect the polarity of the voltage input by the alternating current input source. The alternating current input source polarity detection circuit may detect the polarity of the voltage input by the alternating current input source, so that the first dead time control signal and the second dead time control signal can be determined based on the polarity of the voltage input by the alternating current input source, to control the on/off statuses of the first switching transistor and the second switching transistor based on the first dead time control signal and the second dead time control signal.

In some possible implementations, the alternating current input source polarity detection circuit is configured to: measure a first voltage at the first input end of the alternating current input source and a second voltage at a second input end of the alternating current input source, and calculate a voltage difference between the first voltage and the second voltage; when the voltage difference is greater than a first preset voltage, determine that the voltage input by the alternating current input source is positive, where the first preset voltage is not less than 0; and when the voltage difference is less than a second preset voltage, determine that the voltage input by the alternating current input source is negative, where the second preset voltage is not greater than 0. The first voltage at the first input end of the alternating current input source and the second voltage at the second input end of the alternating current input source are detected, so that the polarity of the voltage input by the alternating current input source can be determined based on the voltage difference between the first voltage and the second voltage.

In some possible implementations, the control apparatus further includes a voltage measurement module, and the voltage measurement module is configured to measure the voltage of the detection resistor. The voltage of the detection resistor may be measured by using the voltage measurement module, and a voltage change slope of the first reference point may be indirectly determined by using the voltage of the detection resistor, so that whether the inductor in the totem-pole PFC circuit crosses zero can be detected and a peak voltage signal, a valley voltage signal, and the like of the first reference point can be detected. Then, the first dead time control signal and the second dead time control signal are determined based on the foregoing parameters, to control the on/off statuses of the first switching transistor and the second switching transistor based on the first dead time control signal and the second dead time control signal.

In some possible implementations, the controller is configured to: generate an indication signal based on the voltage of the detection resistor and the polarity of the voltage input by the alternating current input source; and generate the first dead time control signal and the second dead time control signal based on the indication signal and the polarity of the voltage input by the alternating current input source, where the indication signal is used to indicate dead zones of the first switching transistor and the second switching transistor, and the indication signal includes a first indication signal and a second indication signal. By obtaining the voltage of the detection resistor, it can be determined whether the voltage of the detection resistor is a peak value or a valley value, to generate the indication signal. For example, when a polarity signal indicates that the voltage input by the alternating current input source is positive and the voltage of the detection resistor is a valley value, the indication signal may include the first indication signal indicating that the first switching transistor is in a dead zone; and when the voltage of the detection resistor is a peak value, the indication signal may include the second indication signal indicating that the second switching transistor is in a dead zone.

In some possible implementations, when it is determined that the voltage input by the alternating current input source is positive and that the voltage of the detection resistor is less than a first threshold, the second indication signal is used to indicate that the first switching transistor is in a dead zone; when it is determined that the voltage input by the alternating current input source is positive and that the voltage of the detection resistor is greater than a second threshold, the first indication signal is used to indicate that the second switching transistor is in a dead zone; when it is determined that the voltage input by the alternating current input source is negative and that the voltage of the detection resistor is less than a third threshold, the first indication signal is used to indicate that the first switching transistor is in a dead zone; and when it is determined that the voltage input by the alternating current input source is negative and that the voltage of the detection resistor is greater than a fourth threshold, the second indication signal is used to indicate that the second switching transistor is in a dead zone, where the first threshold is less than the second threshold, and the third threshold is less than the fourth threshold. Different indication signals may be used to indicate whether the first switching transistor and the second switching transistor are in dead zones.

In some possible implementations, the controller includes a first multiplexer switch, a second multiplexer switch, a first comparator, a second comparator, and a phase inverter. An output end of the first multiplexer switch is connected to a negative end of the first comparator, and an output end of the second multiplexer switch is connected to a negative end of the second comparator. An output end of the second comparator is connected to the phase inverter, a first input end of the first multiplexer switch is configured to input a voltage of the fourth threshold, and a second input end of the first multiplexer switch is configured to input a voltage of the first threshold. A first input end of the second multiplexer switch is configured to input a voltage of the third threshold, and a second input end of the second multiplexer switch is configured to input a voltage of the second threshold. A positive end of the first comparator is configured to receive the voltage of the detection resistor, and a positive end of the second comparator is configured to receive the voltage of the detection resistor. When it is determined that the voltage input by the alternating current input source is negative, the controller controls the first multiplexer switch to establish continuity between the first input end and the output end of the first multiplexer switch, and the controller controls the second multiplexer switch to establish continuity between the first input end and the output end of the second multiplexer switch. When it is determined that the voltage input by the alternating current input source is positive, the controller controls the first multiplexer switch to establish continuity between the second input end and the output end of the first multiplexer switch, and the controller controls the second multiplexer switch to establish continuity between the second input end and the output end of the second multiplexer switch. The first comparator is configured to output the first indication signal. The phase inverter is configured to output the second indication signal.

In some possible implementations, the controller is configured to: when it is determined that the voltage input by the alternating current input source is positive, generate the first dead time control signal based on the first indication signal, and generate the second dead time control signal based on the second indication signal; or when it is determined that the voltage input by the alternating current input source is negative, generate the first dead time control signal based on the second indication signal, and generate the second dead time control signal based on the first indication signal.

In some possible implementations, the control apparatus further includes a first pulse generation circuit, where the first pulse generation circuit is configured to generate a first pulse signal and a second pulse signal, the first pulse signal is used to generate the first dead time control signal, and the second pulse signal is used to generate the second dead time control signal. The controller is further configured to: when it is determined that the voltage input by the alternating current input source is positive, generate the first dead time control signal based on the first indication signal and the first pulse signal, and generate the second dead time control signal based on the second indication signal and the second pulse signal; or when it is determined that the voltage input by the alternating current input source is negative, generate the first dead time control signal based on the second indication signal and the first pulse signal, and generate the second dead time control signal based on the first indication signal and the second pulse signal. The control apparatus may further include a sampling module such as an output voltage sampling module and an inductance current sampling module. The output voltage sampling module is configured to send, to the first pulse generation circuit, an output voltage value output to a load. The inductance current sampling module is configured to send a current value of the inductor in the totem-pole PFC circuit to the first pulse generation circuit. The first pulse generation circuit may generate the first pulse signal and the second pulse signal based on the output voltage value and the current value of the inductor. For example, when detecting that the output voltage value output to the load is less than a voltage threshold, the first pulse generation circuit may increase duty cycles of the first pulse signal and the second pulse signal, so that the totem-pole PFC circuit outputs a stable voltage.

In some possible implementations, the control apparatus further includes a frequency detection module and a switch module. The frequency detection module is configured to detect a first signal frequency and a second signal frequency, where the first signal frequency is a frequency of the first pulse signal, and the second signal frequency is a frequency of the second pulse signal. The switch module is configured to: control the on/off status of the first switching transistor based on the first signal frequency, and control the on/off status of the second switching transistor based on the second signal frequency. By using the foregoing structure, switching losses of the switching transistors can be reduced.

In some possible implementations, the totem-pole PFC circuit further includes a first diode and a second diode, both a positive electrode of the first diode and a negative electrode of the second diode are connected to the second input end of the alternating current input source through a second reference point, and a positive electrode of the second diode is grounded. In some possible implementations, the totem-pole PFC circuit further includes a third switching transistor and a fourth switching transistor. Both a source of the third switching transistor and a drain of the fourth switching transistor are connected to the second input end of the alternating current input source through a second reference point, a drain of the third switching transistor is connected to a drain of the first switching transistor, a drain of the third switching transistor is connected to a drain of the first switching transistor, and a source of the fourth switching transistor is grounded. The control apparatus further includes a second pulse generation circuit, where the second pulse generation circuit is configured to generate a third pulse signal and a fourth pulse signal. The controller is further configured to: control an on/off status of the third switching transistor based on the third pulse signal, and control an on/off status of the fourth switching transistor based on the fourth pulse signal. In this way, synchronous rectification on the totem-pole PFC circuit can be implemented.

When hard turn-on occurs or an inductance current in the totem-pole PFC circuit is relatively large, a change rate of a voltage at the first reference point is quite high. As a result, a current generated in the detection capacitor is quite large. Therefore, a voltage of the detection resistor is also quite large, and even may exceed a withstand voltage threshold of a post-stage circuit, causing damage to the post-stage circuit. In view of this, in some possible implementations, the control apparatus further includes a protection circuit, where the protection circuit includes a first voltage regulator tube and a second voltage regulator tube, and the protection circuit is connected in parallel to the detection resistor; and a positive electrode of the first voltage regulator tube is connected to a positive electrode of the second voltage regulator tube, and a negative electrode of the second voltage regulator tube is grounded. By using the first voltage regulator tube and the second voltage regulator tube, a maximum voltage value of the detection resistor can be effectively limited to effectively protect the post-stage circuit. In addition, the maximum voltage value of the detection resistor does not affect dead time control.

According to a second aspect, the embodiments provide a totem-pole PFC circuit control method. A control apparatus is configured to control a totem-pole PFC circuit. The totem-pole PFC circuit includes a first switching transistor and a second switching transistor, a source of the first switching transistor and a drain of the second switching transistor are jointly connected to a first reference point, and a first input end of an alternating current input source is connected to the first reference point through an inductor. The control apparatus includes a controller and a dead time detection circuit, and the dead time detection circuit includes a detection capacitor and a detection resistor. A first end of the detection capacitor is connected to the first reference point, a second end of the detection capacitor is connected to a first end of the detection resistor, and a second end of the detection resistor is grounded. The totem-pole PFC circuit control method is applied to the controller. The method includes: generating a first dead time control signal and a second dead time control signal based on a voltage of the detection resistor and polarity of a voltage input by the alternating current input source; and controlling an on/off status of the first switching transistor based on the first dead time control signal, and controlling an on/off status of the second switching transistor based on the second dead time control signal. For an effect of a corresponding solution in the second aspect, refer to a effect that can be achieved by using the corresponding solution in the first aspect. Details are not described herein.

These aspects or other aspects of the embodiments are more readily apparent from the following description of embodiments.

BRIEF DESCRIPTION OF DRAWINGS

FIG. 1B is a schematic diagram of working statuses of a totem-pole PFC circuit in different on/off statuses;

DETAILED DESCRIPTION OF EMBODIMENTS

Figure 1A:
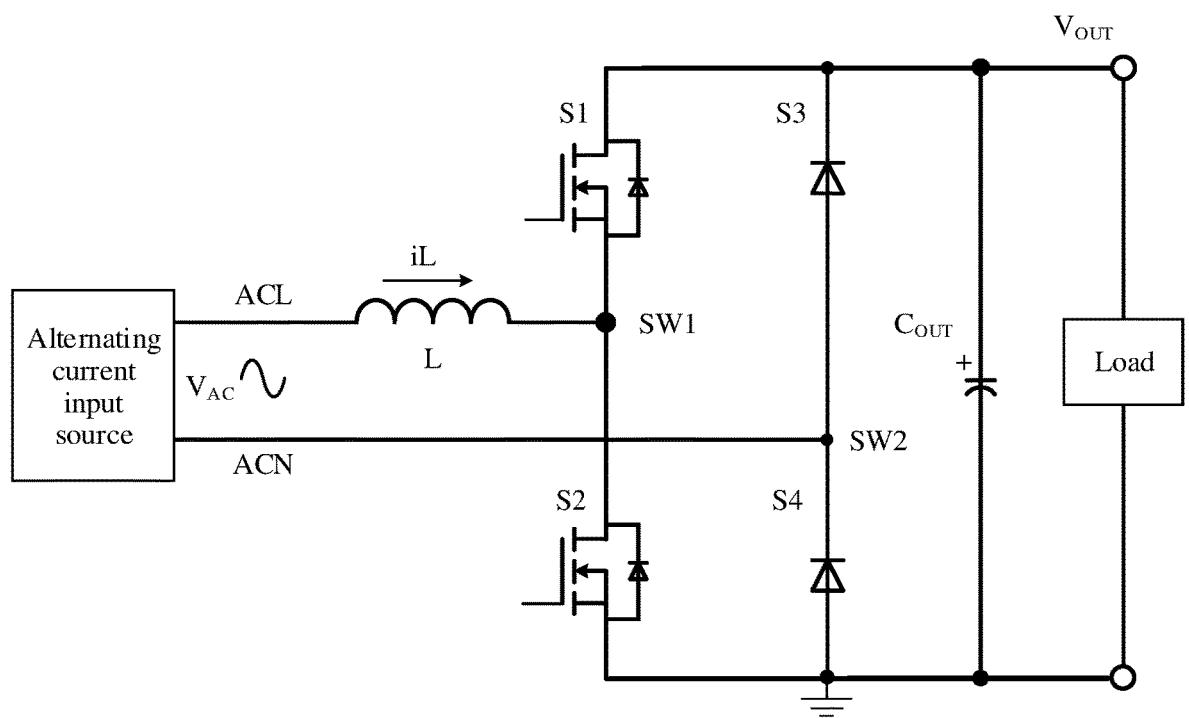
FIG. 1A is a schematic diagram of a structure of a totem-pole PFC circuit.
Figure 1C:
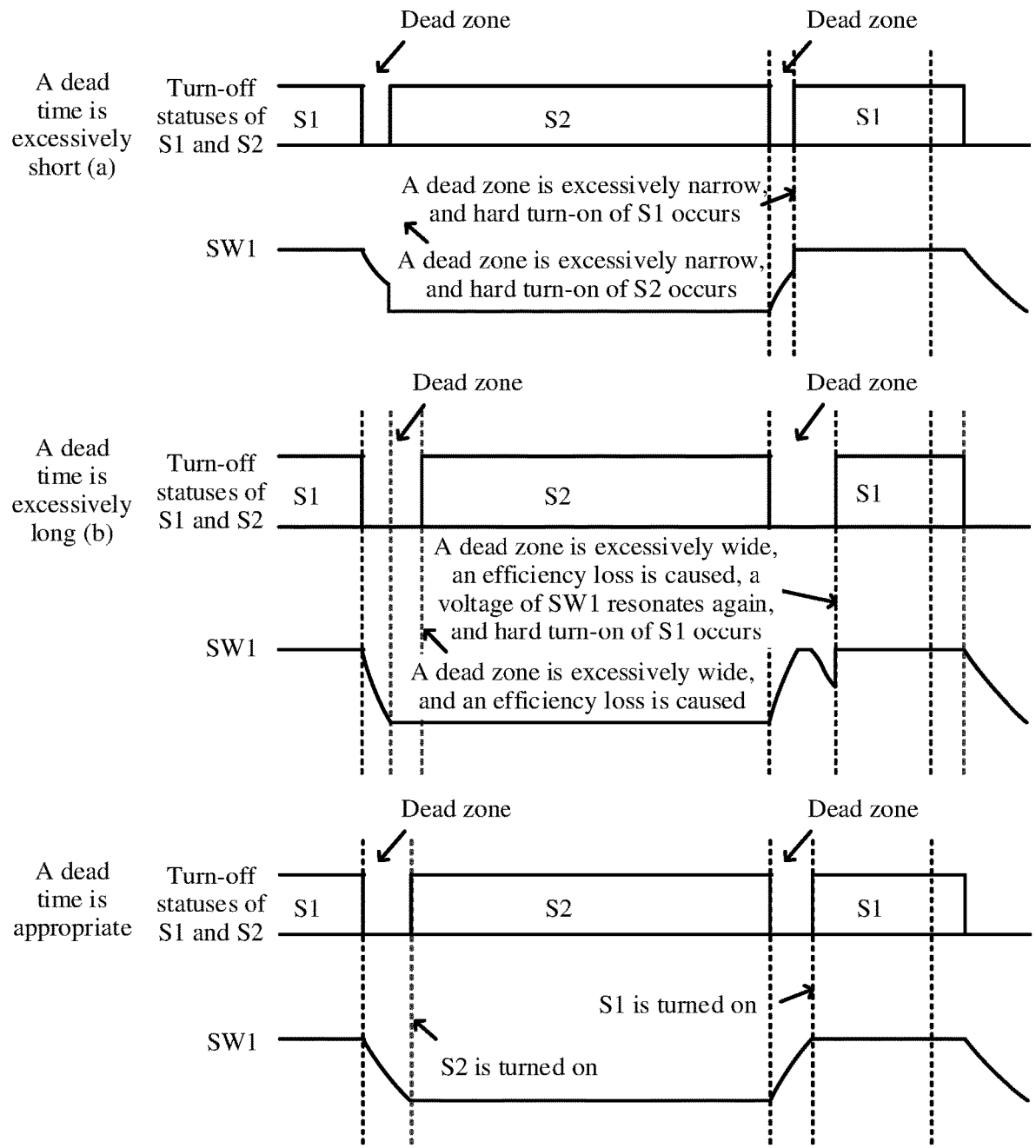
FIG. 1C is a schematic diagram of a signal waveform of a totem-pole PFC circuit.

The following first describes some terms in the embodiments to help a person skilled in the art have a better understanding.

(1) Power factor correction (PFC) circuit: It is a circuit used for power factor correction. A rectifier bridge in a conventional rectification filter circuit is conducted only when an input sine-wave voltage is close to a peak value, and an input current is severely non-sinusoidal, causing a large quantity of harmonic current components. In addition, the harmonic current components may interfere with other power devices. By shaping an input alternating current, the PFC circuit makes the input current shaped into a sinusoidal wave that is similar to and in a same phase as a sinusoidal wave of an input voltage, so that an input power factor is close to 1 as much as possible.

Most of commonly used PFC circuits have boost topological structures. Based on different characteristics of boost topologies in different working modes (discontinuous conduction mode/critical conduction mode/continuous conduction mode), there may be a plurality of different corresponding characteristic control methods.

(2) Totem-pole PFC circuit: A conventional PFC circuit includes a rectifier bridge and a boost PFC circuit, that is, includes two stages. Therefore, the totem-pole PFC circuit is also referred to as a bridge PFC circuit. To further improve efficiency, in a bridgeless PFC circuit, the rectifier bridge and the PFC circuit are combined into a single-stage circuit, eliminating a loss of the rectifier bridge part and implementing functions of rectification and power factor correction. Therefore, the circuit is referred to as a bridgeless PFC circuit. The totem-pole PFC circuit is a topology with optimal efficiency in bridgeless PFC circuits, is simpler than other bridgeless PFC circuits, and may also be referred to as a totem-pole bridgeless PFC circuit.

(3) Dead time: In a PFC circuit, after an upper half bridge is turned off, a lower half bridge is turned on after a delay time, or after a lower half bridge is turned off, an upper half bridge is turned on after a delay time. This can prevent bridge straight-through. The foregoing delay time is a dead time. During this time period, switching transistors in both an upper bridge and a lower bridge are turned off.

It should be noted that "at least one" means one or more, and "a plurality of" means two or more. In view of this, in embodiments, "a plurality of" may also be understood as "at least two". "And/or" describes an association relationship for describing associated objects and represents that three relationships may exist. For example, A and/or B may represent the following three cases: only A exists, both A and B exist, and only B exists. In addition, unless otherwise specified particularly, the character "/" generally indicates an "or" relationship between the associated objects. In addition, it should be understood that terms such as "first" and "second" are merely used for distinguishing and description, but should not be understood as indicating or implying relative importance, or should not be understood as indicating or implying a sequence.

To make the objectives, solutions, and advantages of the embodiments clearer, the following further describes the embodiments in detail with reference to the accompanying drawings.

In a totem-pole PFC circuit, when a dead time is set to be excessively short, a problem of hard turn-on is caused; and when a dead time is set to be excessively long, an electric energy loss is increased, power utilization is reduced, and the problem of hard turn-on is also caused. Therefore, it is necessary to set an appropriate dead time for a switching transistor in the totem-pole PFC circuit to achieve an optimal control effect on the totem-pole PFC circuit.

Figure 2:
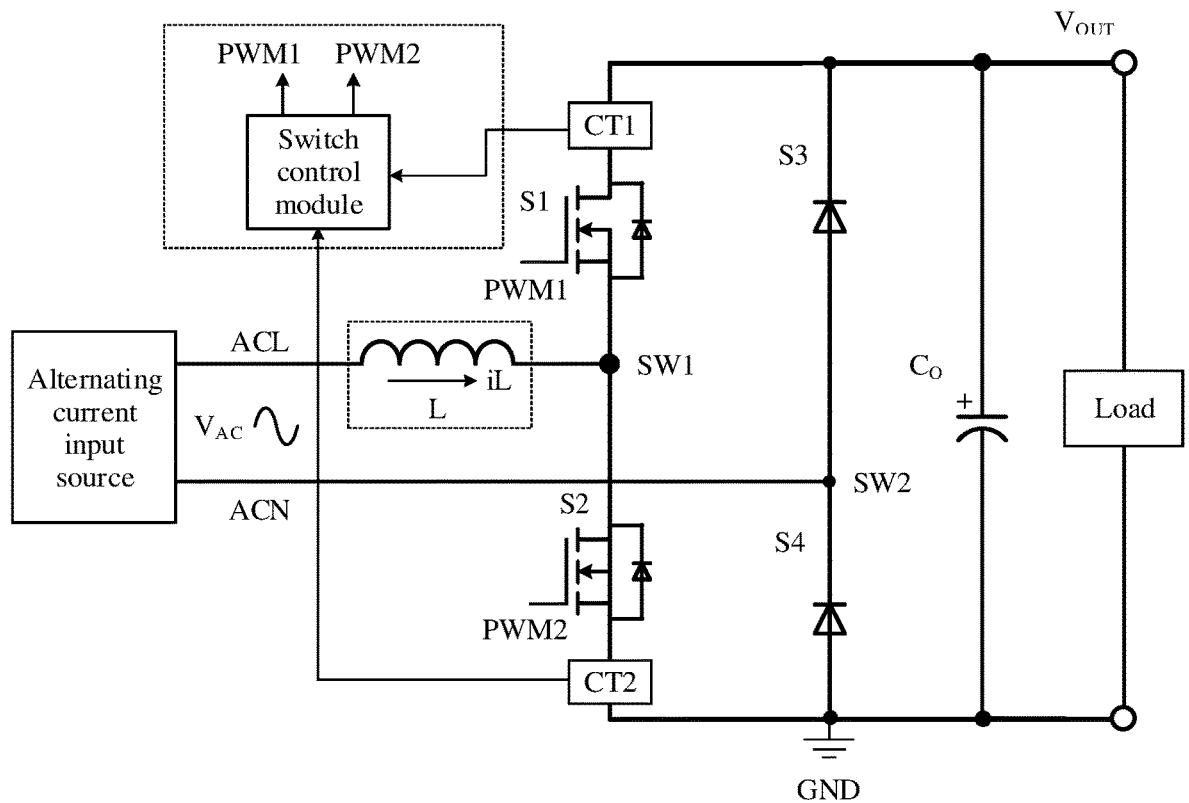
FIG. 2 is a schematic diagram of a structure for controlling a totem-pole PFC circuit.

In some possible implementations, as shown in FIG. 2, current transformers CT1 and CT2 may be respectively connected in series to S1 and S2 in a totem-pole PFC circuit, so that currents respectively flowing through the switching transistors S1 and S2 can be detected. When detecting that polarity of a current through a switching transistor corresponding to a current transformer changes, the current transformer sends, to a switch control module, a message that the polarity changes. After a fixed dead time, the switch control module controls, by using a PWM signal, a next switching transistor to be turned on, to implement zero voltage switching or valley voltage switching of the switching transistors (S1 and S2). However, the current transformer has relatively high costs and a relatively large size. In addition, after the current transformer detects that the polarity of the current changes, the next switching transistor can be turned on only after the fixed dead time. Therefore, the fixed dead time cannot adapt to all working points, and an optimal control effect on the totem-pole PFC circuit cannot be achieved.

Figure 3:
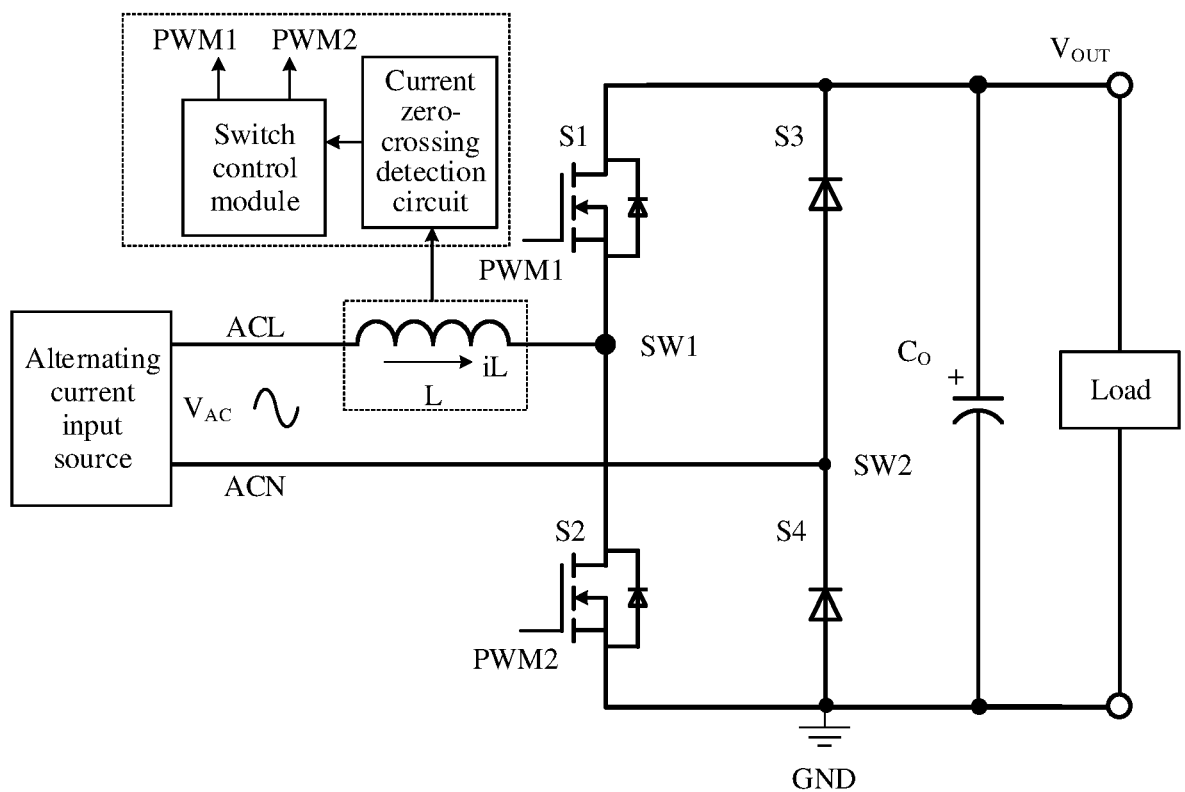
FIG. 3 is a schematic diagram of another structure for controlling a totem-pole PFC circuit.

In some other possible implementations, as shown in FIG. 3, an auxiliary winding or a resistor is added to an inductor L to detect a voltage at two ends of the inductor L. When the inductor L is charged and a current is increased, a voltage of the inductor L is positive. When the inductor L is discharged and a current is decreased, a voltage of the inductor L is negative. Therefore, at two current points corresponding to a maximum current and a minimum current through the inductor L, polarity switching of a voltage of the inductor L can be detected. After a current zero-crossing detection circuit detects a voltage polarity switching signal, the switch control module controls, by using a PWM signal after a fixed dead time, a next switching transistor to be turned on, to implement zero voltage switching or valley voltage switching of the switching transistors (S1 and S2). Similarly, after the current zero-crossing detection circuit detects a voltage polarity switching signal, there is always a fixed dead time before a next switching transistor can be turned on. Therefore, the fixed dead time still cannot adapt to all working points, and an optimal control effect on the totem-pole PFC circuit cannot be achieved.

Still refer to FIG. 1A. Because the voltage $V_{AC}$ input by the alternating current input source in the totem-pole PFC circuit is a sinusoidal alternating current voltage, speeds and time points at which a voltage at the point SW1 changes are different in dead times corresponding to different moments. Therefore, if a control apparatus uses a fixed dead time, an optimal control effect cannot be achieved. In view of this, how to perform optimal control on the totem-pole PFC circuit needs to be urgently resolved by a person skilled in the art.

An embodiment provides a power supply apparatus. The power supply apparatus includes a control apparatus and a totem-pole PFC circuit. The control apparatus may detect polarity of a voltage input into an alternating current input source of the totem-pole PFC circuit, and may further detect a voltage at a first reference point in the totem-pole PFC circuit. In addition, the control apparatus may generate a dead time control signal based on the voltage at the first reference point and the voltage polarity of the voltage input into the alternating current input source. The first reference point is a connection point between a source of an upper bridge arm switching transistor and a drain of a lower bridge arm switching transistor in the totem-pole PFC circuit. The control apparatus in the power supply apparatus may control on/off statuses of the upper bridge arm switching transistor and the lower bridge arm switching transistor in the totem-pole PFC circuit based on the dead time control signal. In this way, the power supply apparatus performs optimal control on the totem-pole PFC circuit.

Figure 4:
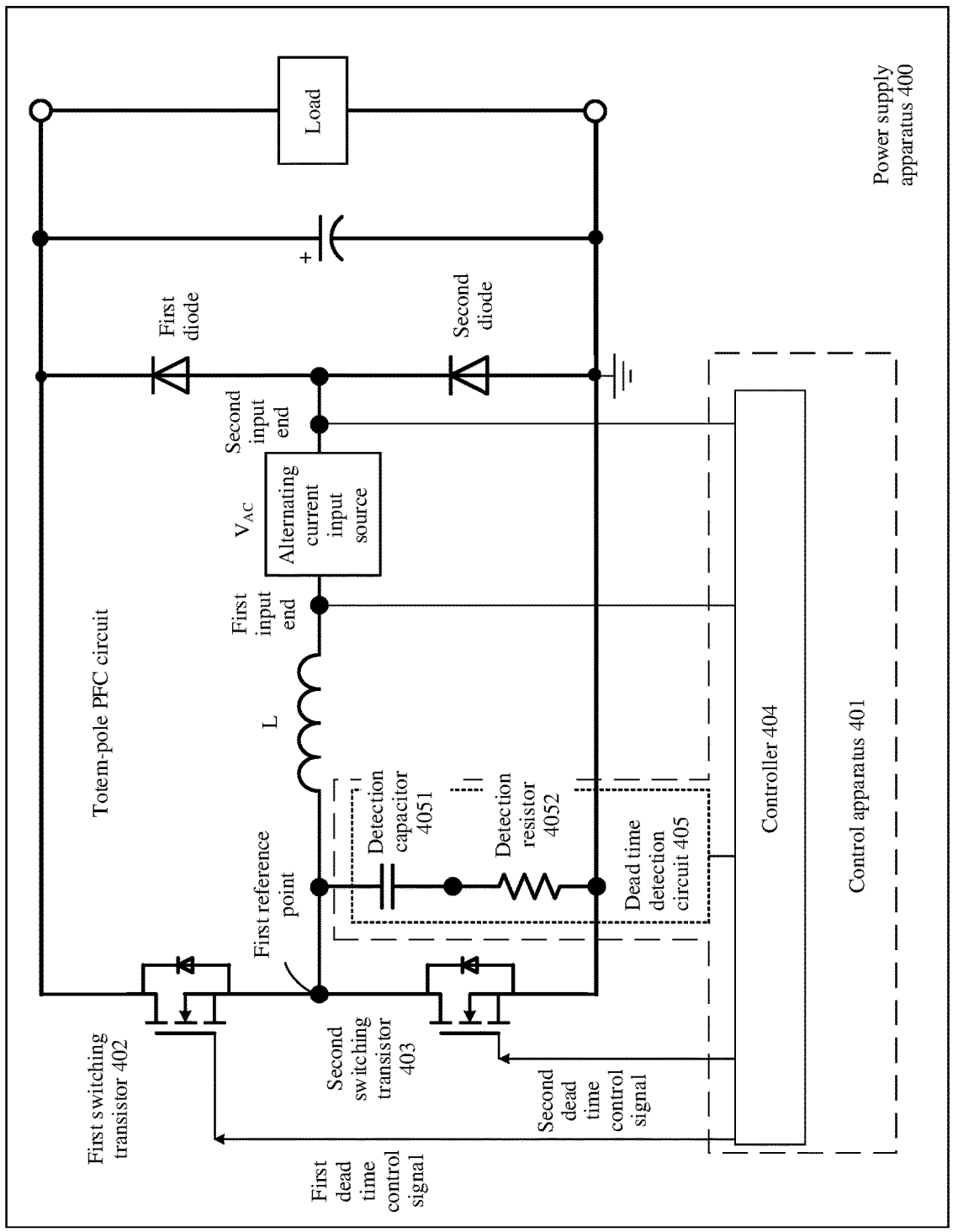
FIG. 4 is a schematic diagram of a structure of a power supply apparatus.

FIG. 4 shows a power supply apparatus 400 according to an embodiment. The power supply apparatus 400 includes a totem-pole power factor correction PFC circuit and a control apparatus 401. The totem-pole PFC circuit includes a first switching transistor 402 and a second switching transistor 403. A source of the first switching transistor 402 and a drain of the second switching transistor 403 are jointly connected to a first reference point, and a first input end of an alternating current input source is connected to the first reference point through an inductor.

The control apparatus 401 includes a controller 404 and a dead time detection circuit 405. The dead time detection circuit 405 includes a detection capacitor 4051 and a detection resistor 4052. A first end of the detection capacitor 4051 is connected to the first reference point, a second end of the detection capacitor 4051 is connected to a first end of the detection resistor 4052, and a second end of the detection resistor 4052 is grounded.

The controller 404 is configured to: generate a first dead time control signal and a second dead time control signal based on a voltage of the detection resistor 4052 and polarity of a voltage input by the alternating current input source, control an on/off status of the first switching transistor 402 based on the first dead time control signal, and control an on/off status of the second switching transistor 403 based on the second dead time control signal.

Optionally, the power supply apparatus 400 may be an alternating current to direct current (AC-DC) converter. The power supply apparatus 400 may control the on/off statuses of the first switching transistor 402 and the second switching transistor 403 in the totem-pole PFC circuit based on the dead time control signals, so that the power supply apparatus 400 can perform optimal control on the totem-pole PFC circuit.

The controller 404 may detect the polarity of the voltage input by the alternating current input source. For example, a voltage difference between a voltage at the first input end of the alternating current input source and a voltage at a second input end of the alternating current input source may be obtained to determine polarity of a voltage currently input by the alternating current input source. Optionally, polarity of a voltage input by the alternating current input source may be determined by directly measuring the voltage input by the alternating current input source.

A resistor-capacitor (RC) circuit may be formed by using the detection capacitor 4051 and the detection resistor 4052. Generally, a magnitude of resistance of the detection resistor 4052 may be determined based on sampling precision, so that a voltage of the detection resistor 4052 is not excessively high, avoiding damage to a post-stage circuit.

Optionally, during on/off switching of the first switching transistor 402 and the second switching transistor 403, a voltage at the first reference point is increased or decreased. After the voltage at the first reference point changes, a current $i_d$ is generated on the detection capacitor 4051. After the current $i_d$ flows through the detection resistor 4052, a voltage $V_{DT}$ is generated on the detection resistor 4052, and the voltage $V_{DT}$ on the detection resistor 4052 is measured. A voltage change slope of the first reference point may be determined by using $V_{DT}$, to detect whether the inductor in the totem-pole PFC circuit crosses zero and detect a peak voltage signal, a valley voltage signal, and the like of the first reference point.

Figure 5:
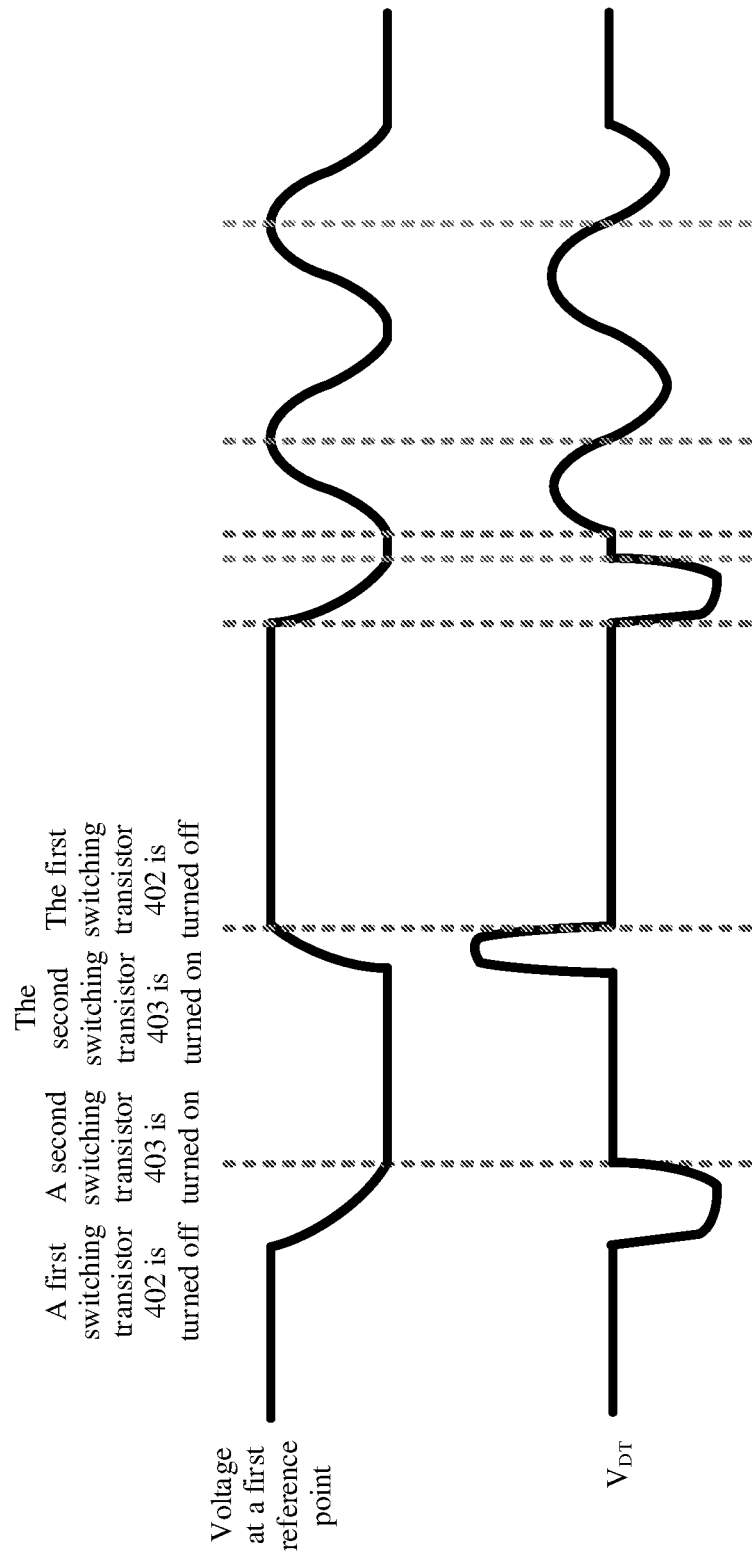
FIG. 5 is a schematic diagram of a signal waveform of a dead time detection circuit.

FIG. 5 is a schematic diagram of a signal waveform of the dead time detection circuit. In a dead time from a time when the first switching transistor 402 is turned off to a time when the second switching transistor 403 is turned on, a voltage $V_{first\ reference\ point}$ at the first reference point is decreased. In a dead time from a time when the second switching transistor 403 is turned off to a time when the first switching transistor 402 is turned on, a voltage $V_{first\ reference\ point}$ is increased. The detection capacitor 4051 is $C_d$, and the detection resistor 4052 is $R_d$. Because a voltage change occurs at the first reference point, a current $i_d$ is generated in $C_d$.

$$i_d = C_d \frac{dV_{first\ reference\ point}}{dt}.$$

Still refer to FIG. 5. A voltage of the detection resistor 4052 generated after $i_d$ flows through $R_d$ is $V_{DT}$. In this case, $$V_{DT} = i_d \cdot R_d = C_d \frac{dV_{first\ reference\ point}}{dt} R_d.$$

A voltage change slope corresponding to $V_{first\ reference\ point}$ may be determined based on a value of $V_{DT}$.

The voltage change slope of the first reference point may be indirectly determined by obtaining the voltage of the detection resistor 4052. A voltage value of the detection resistor 4052 is determined by a capacitance value of the detection capacitor 4051 in the dead time detection circuit 405 and a resistance value of the detection resistor 4052. Because the dead time detection circuit 405 is connected in parallel to the first reference point, the dead time detection circuit 405 does not affect normal operation of the totem-pole PFC circuit. Therefore, an efficiency loss of the totem-pole PFC circuit is not caused.

After the voltage of the detection resistor 4052 is determined, the first dead time control signal and the second dead time control signal may be generated based on the polarity of the voltage from the alternating current input source and the voltage of the detection resistor 4052, to control the on/off statuses of the first switching transistor 402 and the second switching transistor 403. In addition, the controller 404 may alternatively be a processor, a central processing unit (CPU), a system on chip (SoC), an electronic control unit (ECU), digital signal processor (DSP), an application-specific integrated circuit (ASIC), a programmable logic device (PLD), a field programmable gate array (FPGA), or another transistor logic device, a hardware component, or any combination thereof. Alternatively, the processor may be a combination of processors for implementing a computing function, for example, a combination of one or more microprocessors, or a combination of a DSP and a microprocessor. Details are not listed one by one in the embodiments.

The following uses examples to further describe some specific structures of the control apparatus 401.

Figure 6A:
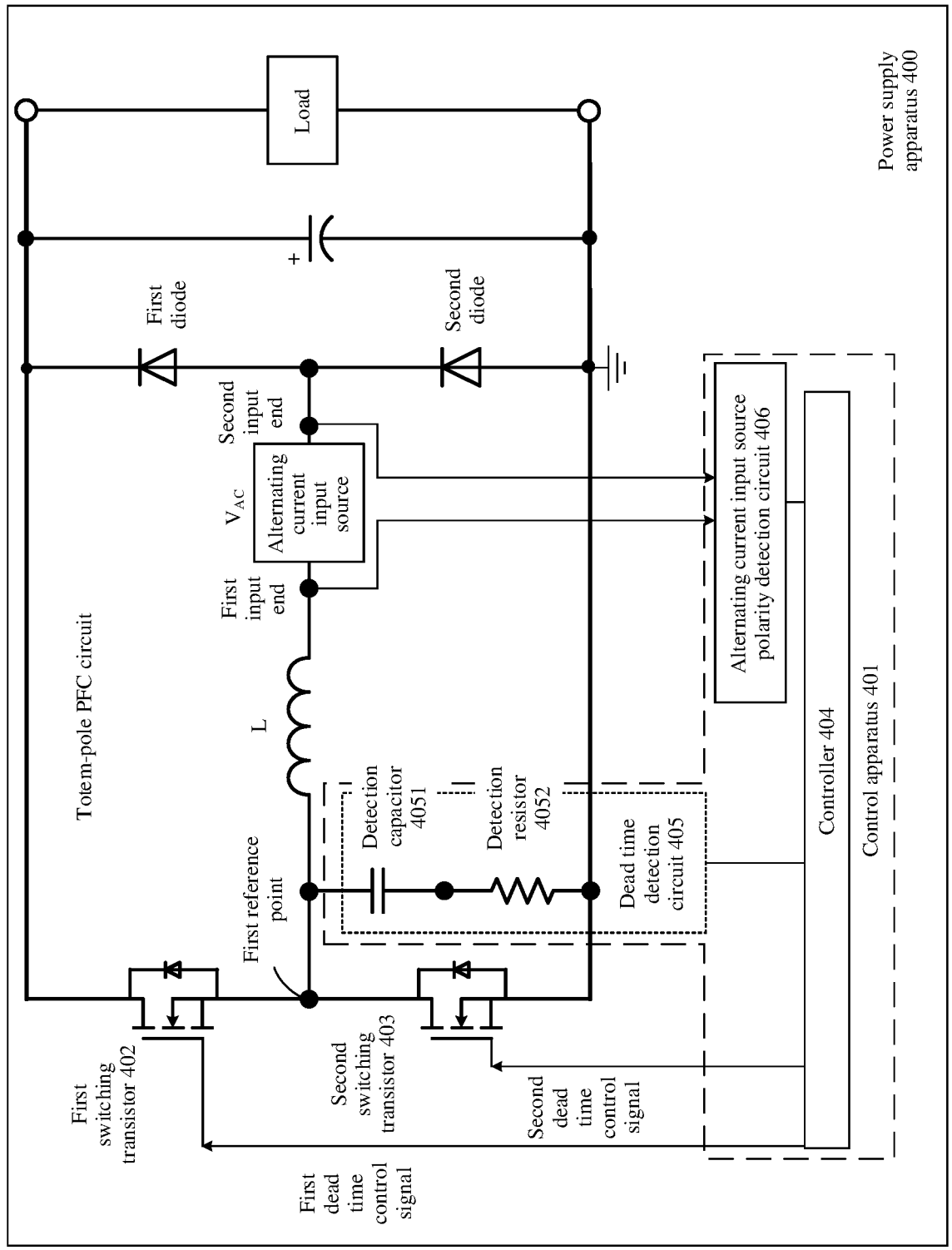
FIG. 6A is a schematic diagram of a control apparatus including an alternating current input source polarity detection circuit.

In some possible implementations, as shown in FIG. 6A, the control apparatus 401 further includes an alternating current input source polarity detection circuit 406. The alternating current input source polarity detection circuit 406 is configured to detect polarity of a voltage input by the alternating current input source. The alternating current input source polarity detection circuit 406 may be connected to two ends of the alternating current input source to determine, based on a voltage at the first input end and a voltage at the second input end that are input by the alternating current input source, the polarity of the voltage input by the alternating current input source. For example, a voltage difference between the voltage at the first input end of the alternating current input source and the voltage at the second input end of the alternating current input source may be obtained to determine polarity of a voltage currently input by the alternating current input source.

In some possible implementations, the alternating current input source polarity detection circuit 406 is configured to: measure a first voltage at the first input end of the alternating current input source and a second voltage at a second input end of the alternating current input source, and calculate a voltage difference between the first voltage and the second voltage; when the voltage difference is greater than a first preset voltage, determine that the voltage input by the alternating current input source is positive, where the first preset voltage is not less than 0; and when the voltage difference is less than a second preset voltage, determine that the voltage input by the alternating current input source is negative, where the second preset voltage is not greater than 0. The first voltage at the first input end of the alternating current input source and the second voltage at the second input end of the alternating current input source are detected, and a polarity signal is output. In this way, the controller 404 can determine, based on the polarity signal, the polarity of the voltage input by the alternating current input source.

Figure 6B:
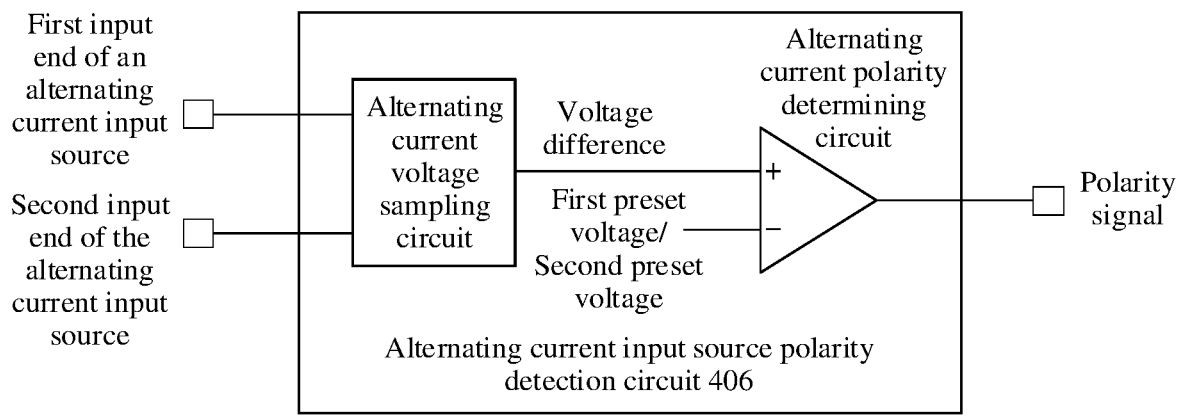
FIG. 6B is a schematic diagram of a structure of an alternating current input source polarity detection circuit.
Figure 6C:
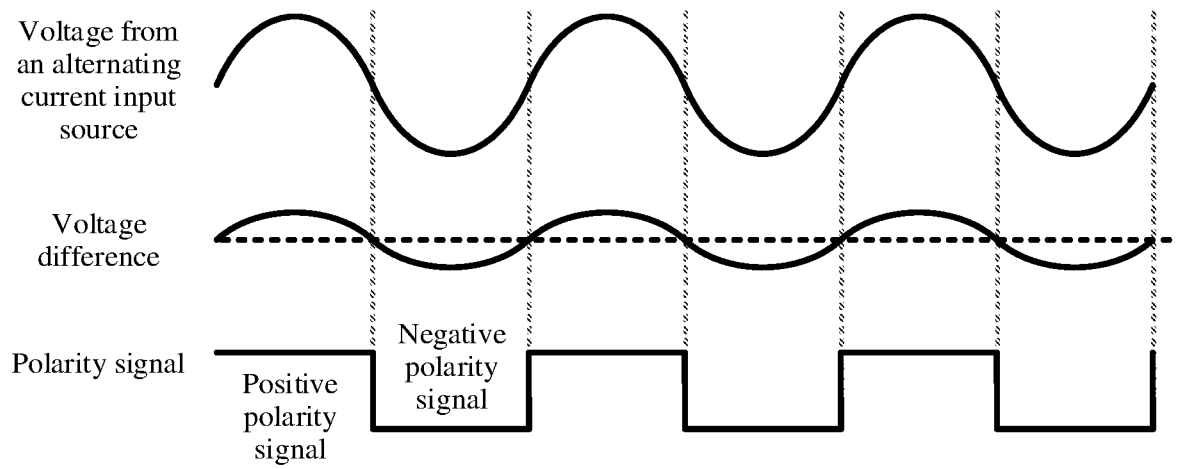
FIG. 6C is a schematic diagram of a signal waveform of an alternating current input source polarity detection circuit.

For example, as shown in FIG. 6B, the alternating current input source polarity detection circuit 406 may include an alternating current voltage sampling circuit and an alternating current polarity determining circuit. The alternating current voltage sampling circuit may be a subtractor, and is configured to calculate the difference between the first voltage at the first input end of the alternating current input source and the second voltage at the second input end of the alternating current input source, to input the voltage difference to the alternating current polarity determining circuit. For example, the alternating current polarity determining circuit may be a comparator, to determine polarity of a voltage input by the alternating current input source. FIG. 6C is a waveform diagram of a voltage input by the alternating current input source, a voltage difference, and a polarity signal. As shown in FIG. 6C, when the voltage input by the alternating current input source is positive and the voltage difference is greater than 0, a high level signal used to indicate positive polarity is output. When the voltage input by the alternating current input source is negative and the voltage difference is less than 0, a low level signal used to indicate negative polarity is output.

Figure 7:
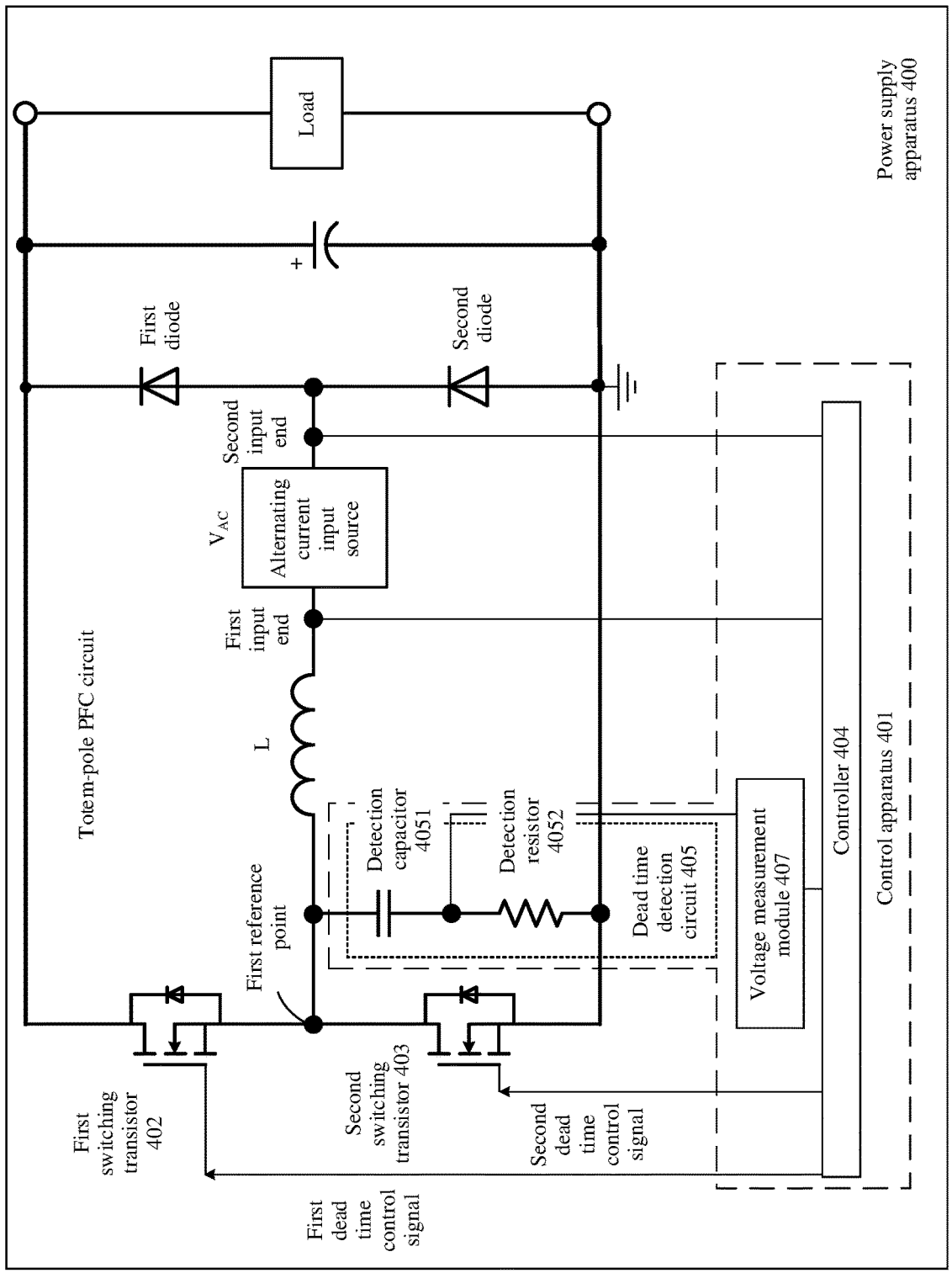
FIG. 7 is a schematic diagram of a control apparatus including a voltage measurement module.

In some possible implementations, as shown in FIG. 7, the control apparatus 401 further includes a voltage measurement module 407. The voltage measurement module 407 is configured to measure the voltage of the detection resistor. In some possible implementations, the controller 404 is configured to: generate an indication signal based on the voltage of the detection resistor 4052 and the polarity of the voltage input by the alternating current input source; and generate the first dead time control signal and the second dead time control signal based on the indication signal and the polarity of the voltage input by the alternating current input source, where the indication signal is used to indicate dead zones of the first switching transistor 402 and the second switching transistor 403, and the indication signal includes a first indication signal and a second indication signal.

In some possible implementations, when it is determined that the voltage input by the alternating current input source is positive and that the voltage of the detection resistor 4052 is less than a first threshold, the second indication signal is used to indicate that the first switching transistor 402 is in a dead zone; when it is determined that the voltage input by the alternating current input source is positive and that the voltage of the detection resistor 4052 is greater than a second threshold, the first indication signal is used to indicate that the second switching transistor 403 is in a dead zone; when it is determined that the voltage input by the alternating current input source is negative and that the voltage of the detection resistor 4052 is less than a third threshold, the first indication signal is used to indicate that the first switching transistor 402 is in a dead zone; and when it is determined that the voltage input by the alternating current input source is negative and that the voltage of the detection resistor 4052 is greater than a fourth threshold, the second indication signal is used to indicate that the second switching transistor 403 is in a dead zone, where the first threshold is less than the second threshold, and the third threshold is less than the fourth threshold.

Figure 8A:
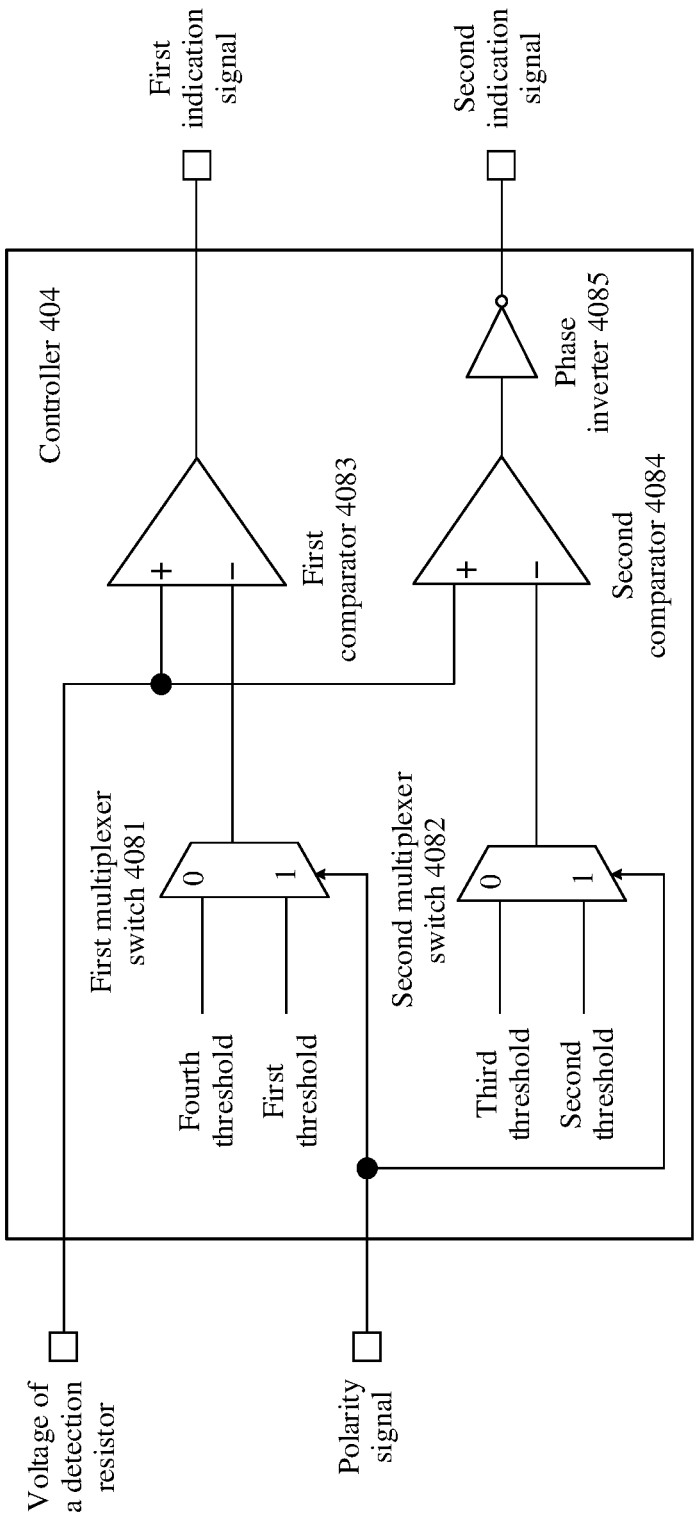
FIG. 8A is a schematic diagram of a structure of a controller.

In some possible implementations, as shown in FIG. 8A, the controller 404 includes a first multiplexer switch 4081, a second multiplexer switch 4082, a first comparator 4083, a second comparator 4084, and a phase inverter 4085. An output end of the first multiplexer switch 4081 is connected to a negative end of the first comparator 4083, and an output end of the second multiplexer switch 4082 is connected to a negative end of the second comparator 4084. An output end of the second comparator 4084 is connected to the phase inverter 4085, a first input end of the first multiplexer switch 4081 is configured to input a voltage of the fourth threshold, and a second input end of the first multiplexer switch 4081 is configured to input a voltage of the first threshold. A first input end of the second multiplexer switch 4082 is configured to input a voltage of the third threshold, and a second input end of the second multiplexer switch 4082 is configured to input a voltage of the second threshold. A positive end of the first comparator 4083 is configured to receive the voltage of the detection resistor 4052, and a positive end of the second comparator 4084 is configured to receive the voltage of the detection resistor 4052.

When it is determined that the voltage input by the alternating current input source is negative, the controller 404 controls the first multiplexer switch 4081 to establish continuity between the first input end and the output end of the first multiplexer switch 4081, and the controller 404 controls the second multiplexer switch 4082 to establish continuity between the first input end and the output end of the second multiplexer switch 4082. When it is determined that the voltage input by the alternating current input source is positive, the controller 404 controls the first multiplexer switch to establish continuity between the second input end and the output end of the first multiplexer switch, and the controller 404 controls the second multiplexer switch 4082 to establish continuity between the second input end and the output end of the second multiplexer switch 4082. The first comparator 4083 is configured to output the first indication signal. The phase inverter 4085 is configured to output the second indication signal.

Figure 8B:
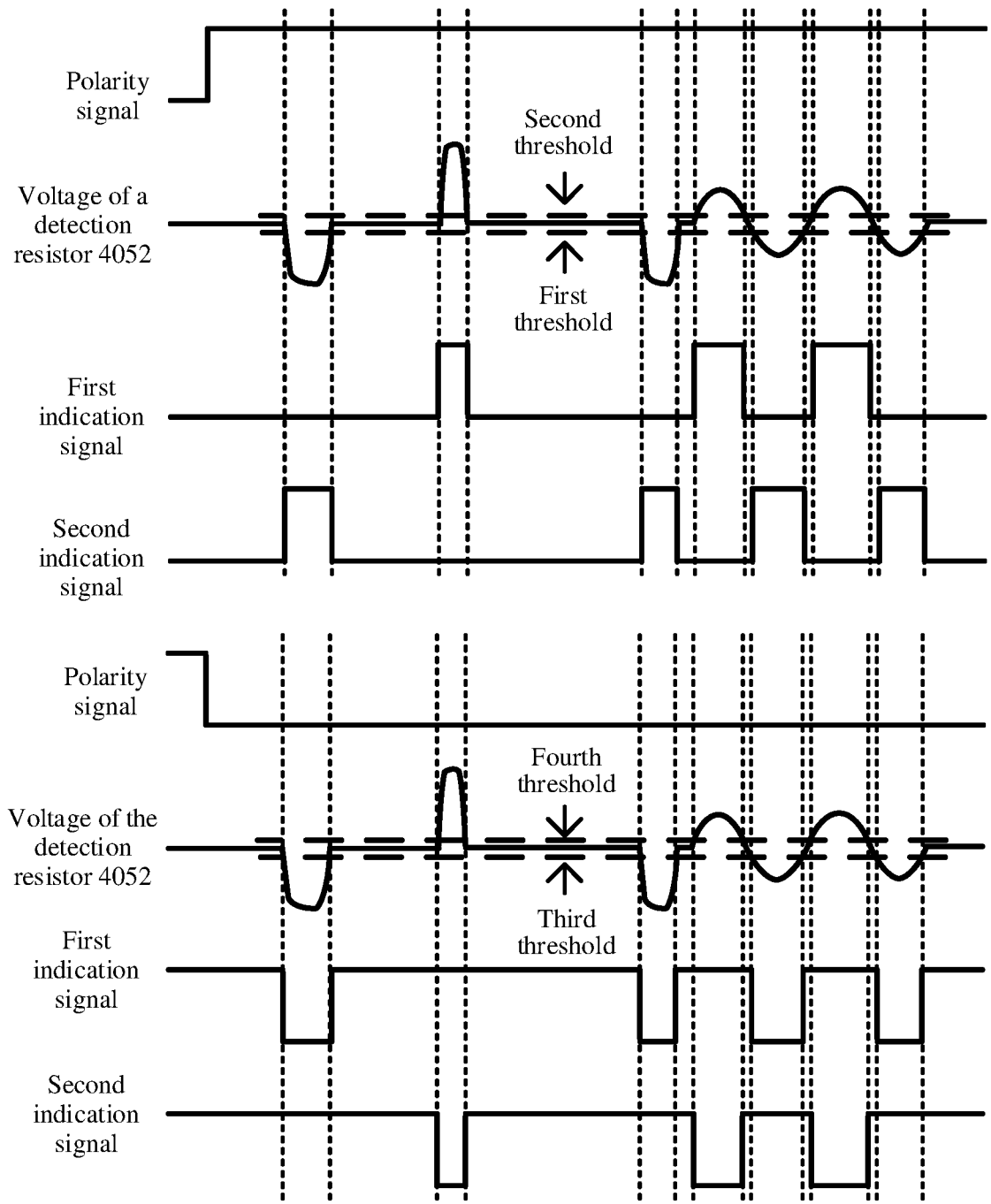
FIG. 8B is a schematic diagram of a signal waveform of a controller.

FIG. 8B is a schematic diagram of a signal waveform of the controller. As shown in FIG. 8B, the first threshold is less than the second threshold, and the third threshold is less than the fourth threshold. When the polarity signal is a positive polarity signal (high level), the first indication signal and the second indication signal are low-level signals. When the voltage of the detection resistor 4052 is greater than the second threshold, the first indication signal is converted into a high-level signal. When the voltage of the detection resistor 4052 is less than the first threshold, the second indication signal is converted into a high-level signal. When the polarity signal is a negative polarity signal (low level), the first indication signal and the second indication signal are high-level signals. When the voltage of the detection resistor 4052 is less than the third threshold, the first indication signal is converted into a low-level signal. When the voltage of the detection resistor 4052 is greater than the fourth threshold, the second indication signal is converted into a high-level signal.

In some possible implementations, the controller 404 is configured to: when it is determined that the voltage input by the alternating current input source is positive, generate the first dead time control signal based on the first indication signal, and generate the second dead time control signal based on the second indication signal; or when it is determined that the voltage input by the alternating current input source is negative, generate the first dead time control signal based on the second indication signal, and generate the second dead time control signal based on the first indication signal.

Figure 9:
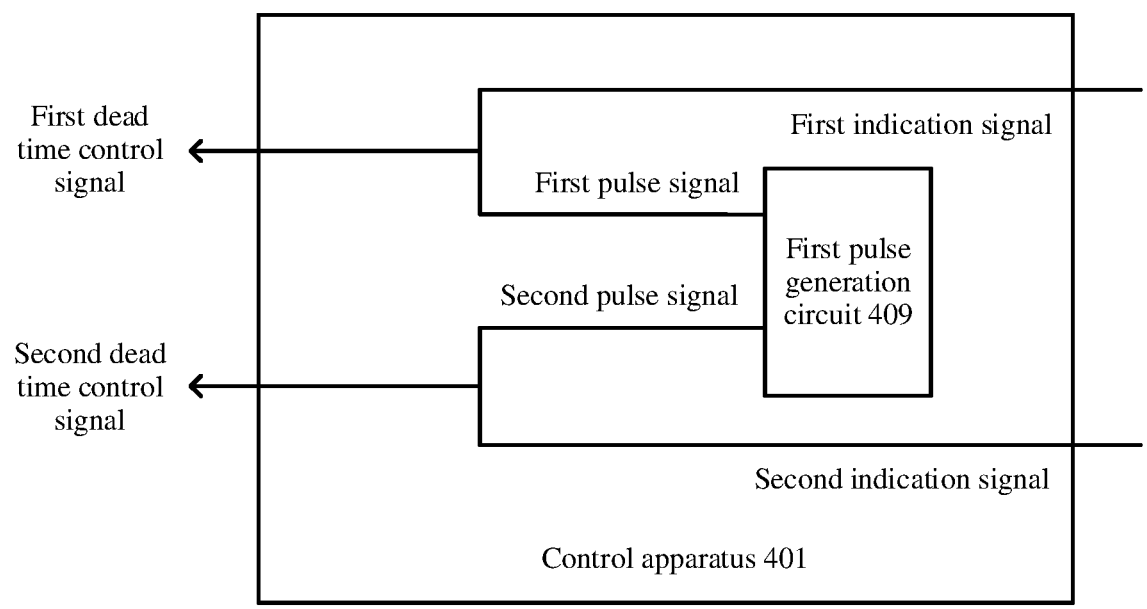
FIG. 9 is a schematic diagram of a control apparatus including a first pulse generation circuit.

In some possible implementations, as shown in FIG. 9, the control apparatus 401 may further include a first pulse generation circuit 409. The first pulse generation circuit 409 is configured to generate a first pulse signal and a second pulse signal. The first pulse signal is used to generate the first dead time control signal, and the second pulse signal is used to generate the second dead time control signal. The controller 404 is further configured to: when it is determined that the voltage input by the alternating current input source is positive, generate the first dead time control signal based on the first indication signal and the first pulse signal, and generate the second dead time control signal based on the second indication signal and the second pulse signal; or when it is determined that the voltage input by the alternating current input source is negative, generate the first dead time control signal based on the second indication signal and the first pulse signal, and generate the second dead time control signal based on the first indication signal and the second pulse signal. For example, the first pulse signal and the second pulse signal may be pulse modulation signals (PWM).

Optionally, the control apparatus 401 may further include a sampling module such as an output voltage sampling module and an inductance current sampling module. The output voltage sampling module is configured to send, to the first pulse generation circuit 409, an output voltage value output to a load. The inductance current sampling module is configured to send a current value of the inductor in the totem-pole PFC circuit to the first pulse generation circuit 409. The first pulse generation circuit 409 may generate the first pulse signal and the second pulse signal based on the output voltage value and the current value of the inductor.

In some possible implementations, the totem-pole PFC circuit may further include a first diode and a second diode, and both a positive electrode of the first diode and a negative electrode of the second diode are connected to the second input end of the alternating current input source through a second reference point. A positive electrode of the second diode is grounded.

Figure 10A:
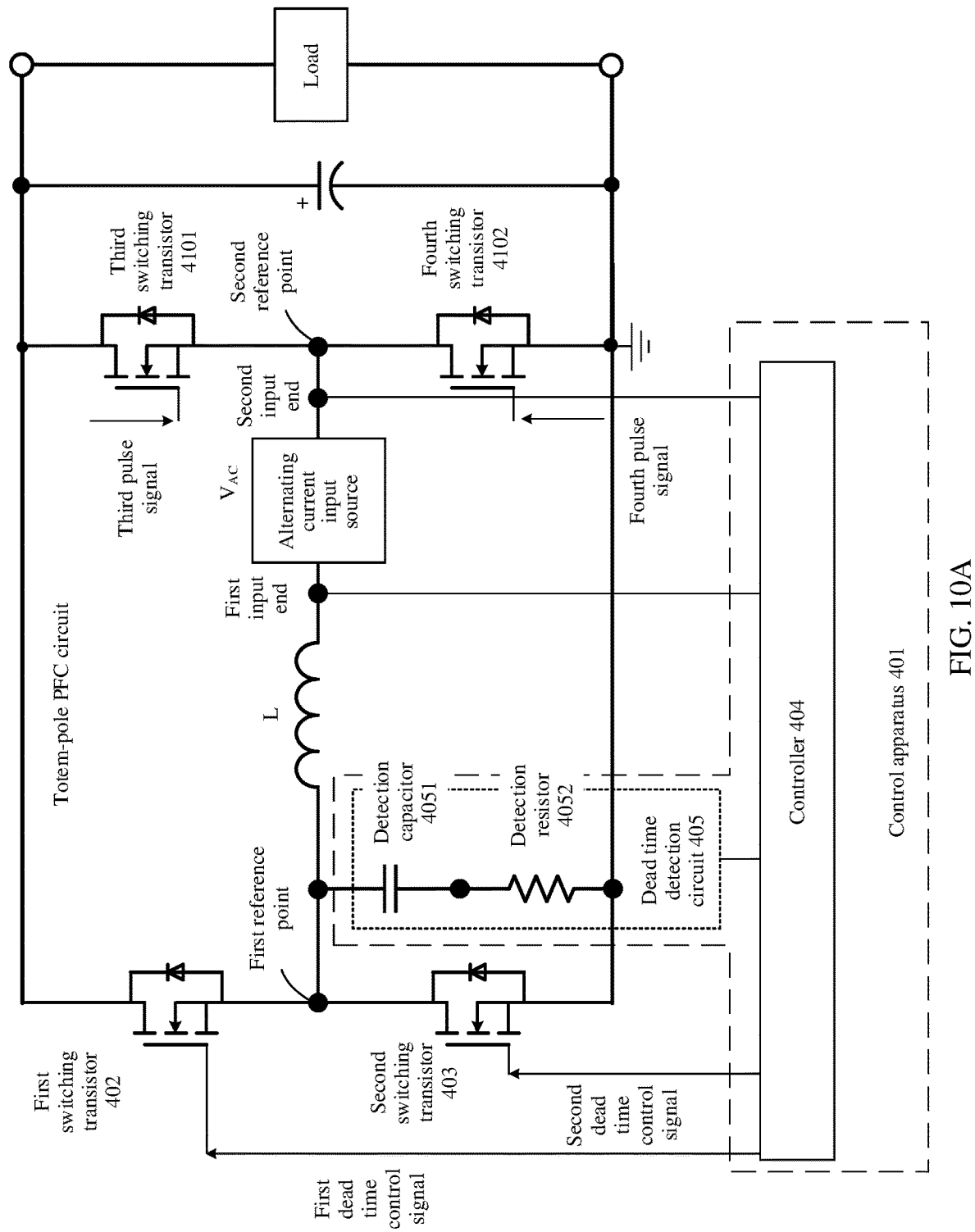
FIG. 10A is a schematic diagram of a structure of a totem-pole PFC circuit on which synchronous rectification is performed.

In some other possible implementations, to implement synchronous rectification on the totem-pole PFC circuit, as shown in FIG. 10A, the totem-pole PFC circuit further includes a third switching transistor 4101 and a fourth switching transistor 4102. Both a source of the third switching transistor 4101 and a drain of the fourth switching transistor 4102 are connected to the second input end of the alternating current input source through a second reference point, a drain of the third switching transistor 4101 is connected to a drain of the first switching transistor 402, and a source of the fourth switching transistor 4102 is grounded.

Figure 10B:
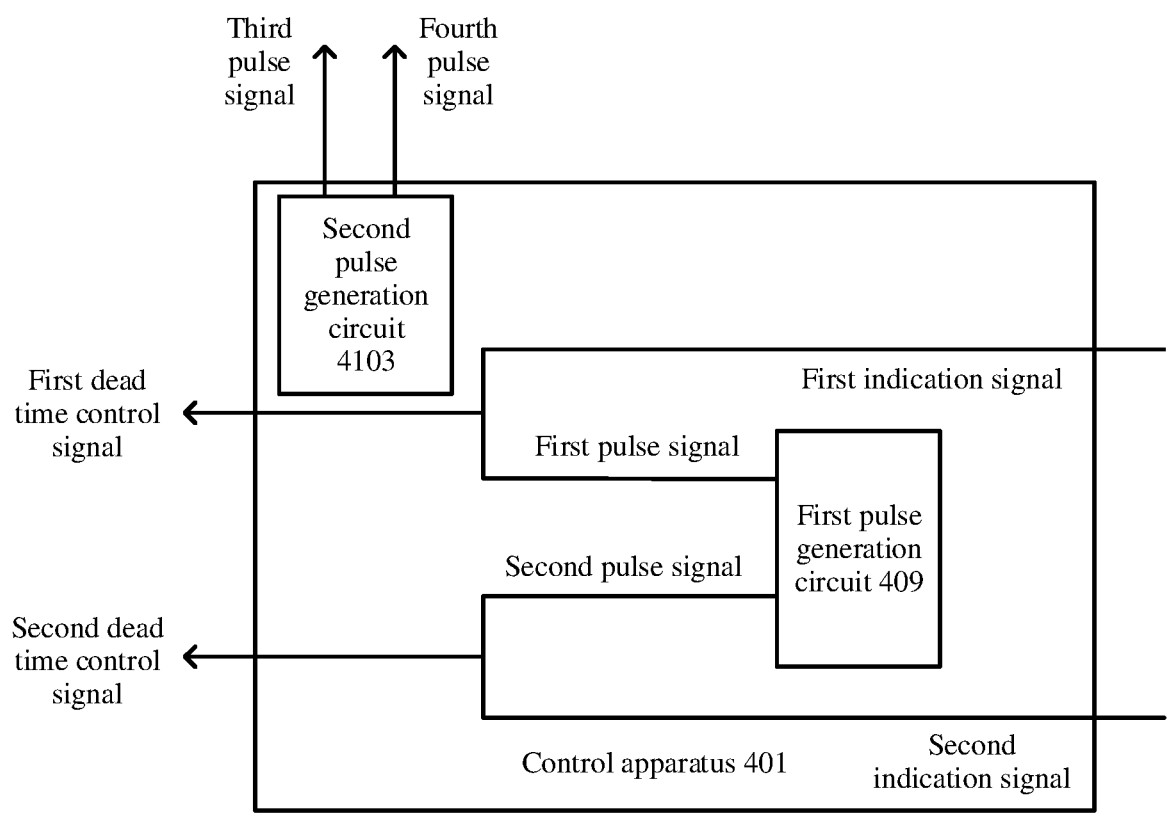
FIG. 10B is a schematic diagram of a control apparatus including a second pulse generation circuit.

As shown in FIG. 10B, the control apparatus 401 may further include a second pulse generation circuit 4103. The second pulse generation circuit 4103 is configured to generate a third pulse signal and a fourth pulse signal. The controller 404 controls an on/off status of the third switching transistor 4101 based on the third pulse signal, and controls an on/off status of the fourth switching transistor 4102 based on the fourth pulse signal, to implement synchronous rectification on the totem-pole PFC circuit.

Figure 11:
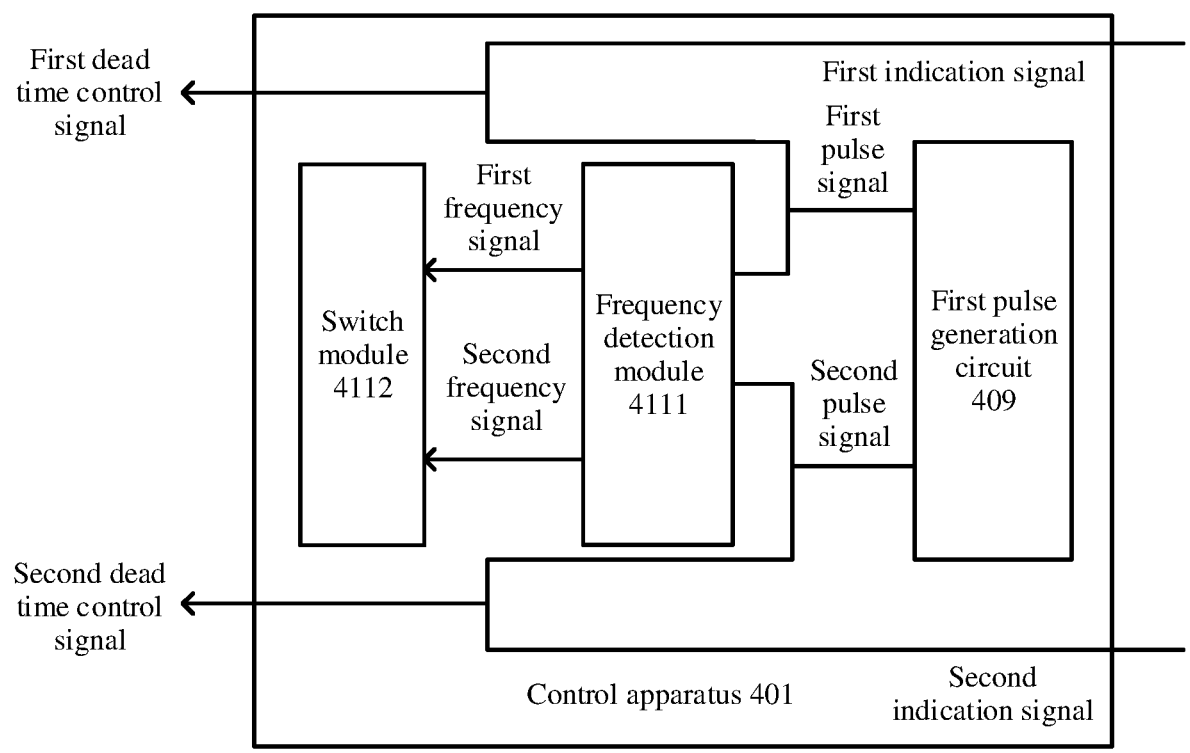
FIG. 11 is a schematic diagram of a structure of another control apparatus.

In addition, it can be understood from an operating principle of the totem-pole PFC circuit that, as load decreases, when the alternating current input source is in a low phase, frequencies of the first pulse signal and the second pulse signal generated by the first pulse generation circuit 409 continuously increase, causing a relatively large switching loss. In some possible implementations, as shown in FIG. 11, the control apparatus 401 further includes a frequency detection module 4111 and a switch module 4112. The frequency detection module 4111 is configured to detect a first signal frequency and a second signal frequency. The first signal frequency is a frequency of the first pulse signal, and the second signal frequency is a frequency of the second pulse signal. The switch module 4112 is configured to: control the on/off status of the first switching transistor based on the first signal frequency, and control the on/off status of the second switching transistor based on the second signal frequency.

The frequency detection module 4111 is configured to detect the first signal frequency and the second signal frequency. The first signal frequency is a frequency of the first pulse signal, and the second signal frequency is a frequency of the second pulse signal. The switch module 4112 is configured to: control the on/off status of the first switching transistor 402 based on the first signal frequency, and control the on/off status of the second switching transistor 403 based on the second signal frequency. Optionally, if the first signal frequency is greater than a frequency threshold, a next period is not started, and the next period is allowed to be started only when it is detected that the frequency is less than the frequency threshold; or when the second signal frequency is greater than the frequency threshold, a next period is not started, and the next period is allowed to be started only when it is detected that the frequency is less than the frequency threshold.

Figure 12:
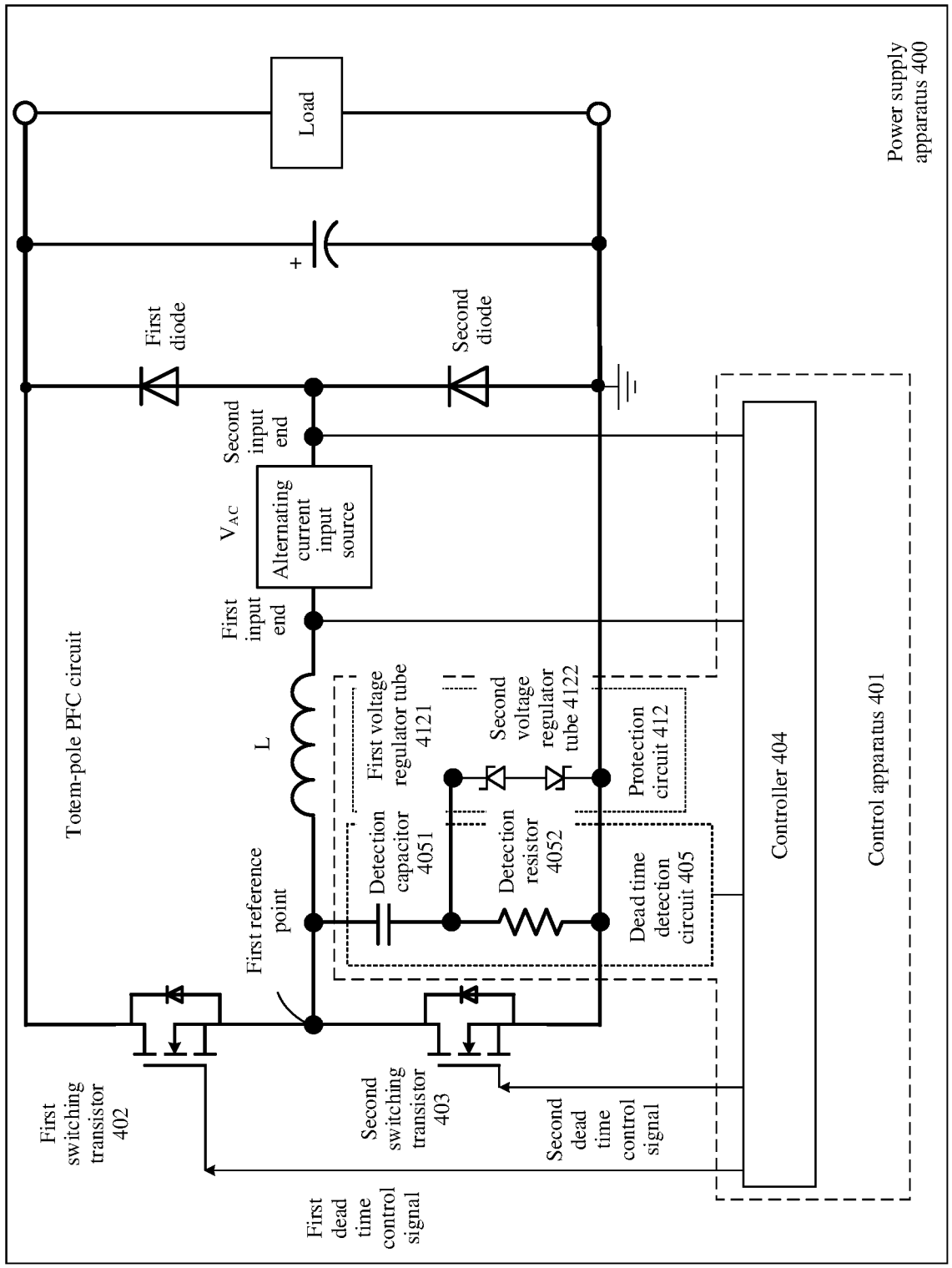
FIG. 12 is a schematic diagram of a structure of a control apparatus including a protection circuit.

When hard turn-on occurs or an inductance current in the totem-pole PFC circuit is relatively large, a change rate of a voltage at the first reference point is quite high. As a result, a current generated in the detection capacitor 4051 is quite large. Therefore, a voltage of the detection resistor 4052 is also quite large, and even may exceed a withstand voltage threshold of a post-stage circuit, causing damage to the post-stage circuit. In view of this, in some possible implementations, as shown in FIG. 12, the control apparatus 401 may further include a protection circuit 412. The protection circuit 412 is connected in parallel to the detection resistor 4052.

In the protection circuit 412, a positive electrode of a first voltage regulator tube 4121 is connected to a positive electrode of a second voltage regulator tube 4122, and a negative electrode of the second voltage regulator tube 4122 is grounded. By using the first voltage regulator tube 4121 and the second voltage regulator tube 4122, a maximum voltage value of the detection resistor 4052 can be effectively limited to effectively protect a post-stage circuit. In addition, the maximum voltage value of the detection resistor 4052 does not affect dead time control.

Optionally, this embodiment provides a mode for controlling the totem-pole PFC circuit by the control apparatus 401. The mode may include a mode 1 to a mode 4.

Mode 1: The Alternating Current Input Source Inputs a Positive Voltage.

When it is determined that the voltage input by the alternating current input source is positive, the polarity signal is a positive polarity signal, the first indication signal is used to control a dead time from a time when the second switching transistor 403 is turned off to a time when the first switching transistor 402 is turned on, and the second indication signal is used to control a dead time from a time when the first switching transistor 402 is turned off to a time when the second switching transistor 403 is turned on.

Figure 13:
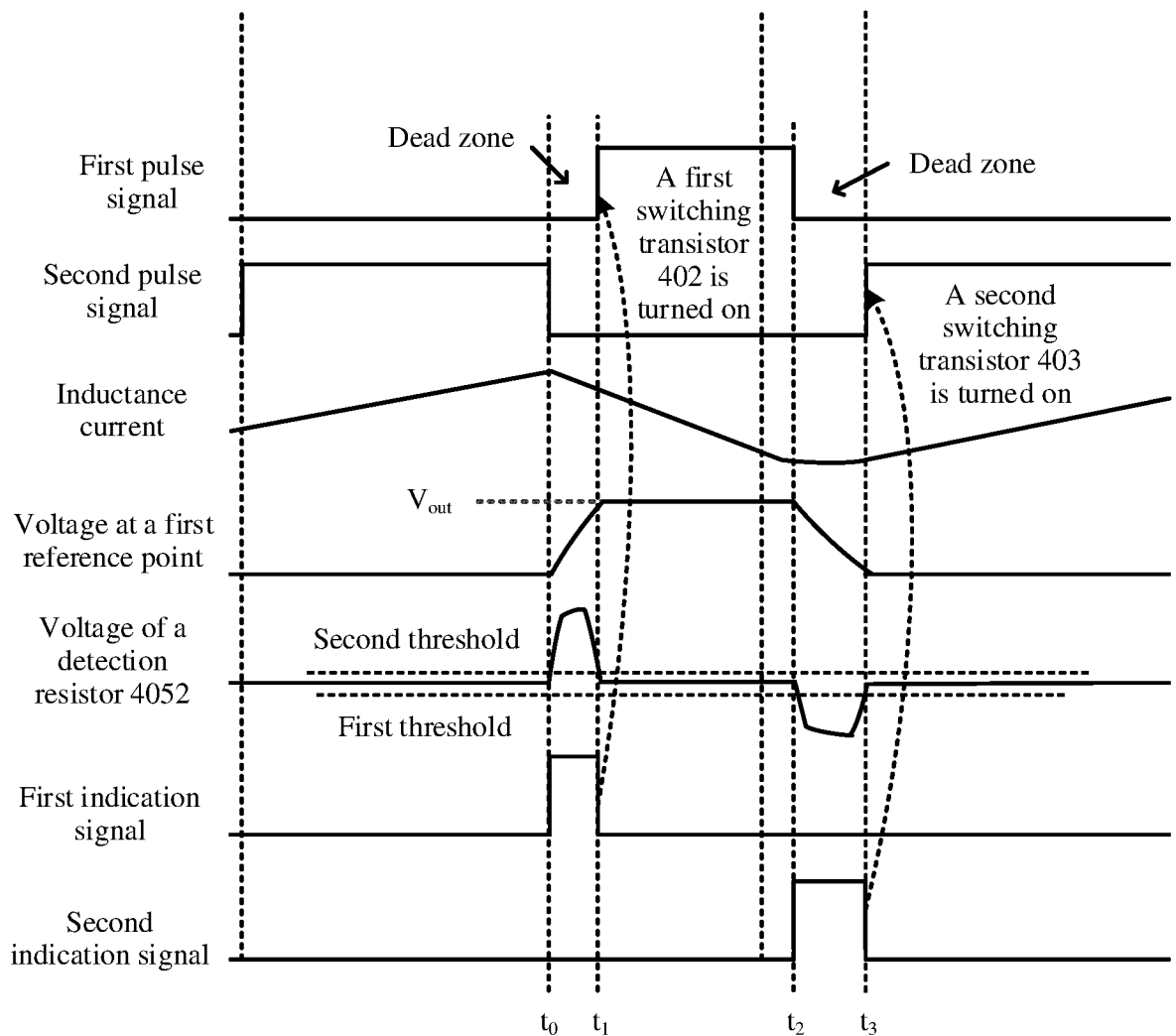
FIG. 13 is a schematic diagram of operating waveforms of a totem-pole PFC circuit.

As shown in FIG. 13, at a moment t0, the second switching transistor 403 is turned off, and an inductance current charges a parasitic capacitor of the second switching transistor 403 and discharges a parasitic capacitor of the first switching transistor 402. Therefore, a voltage at the first reference point is increased. At a moment $t_1$, the first indication signal changes from 1 to 0, and corresponds to a moment at which the voltage at the first reference point is increased to be equal to Vout. In this case, the first switching transistor 402 is controlled to be turned on. When the first switching transistor 402 is turned on, a voltage between the drain and the source thereof is 0. This implements zero-voltage switching. At a moment $t_2$, the first switching transistor 402 is turned off, the parasitic capacitor of the second switching transistor 403 is discharged, and the parasitic capacitor of the first switching transistor 402 is charged. Therefore, the voltage at the first reference point is decreased. At a moment $t_3$, the first indication signal changes from 1 to 0, and corresponds to a moment at which the voltage at the first reference point is decreased to 0. In this case, the second switching transistor 403, may be controlled to be turned on. When the second switching transistor 403 is turned on, a voltage between the drain and a source thereof is 0. This can implement zero-voltage switching.

Mode 2: The Alternating Current Input Source Inputs a Negative Voltage.

When it is determined that the voltage input by the alternating current input source is negative, the polarity signal is a negative polarity signal, the first indication signal is used to control a dead time from a time when the first switching transistor 402 is turned off to a time when the second switching transistor 403 is turned on, and the second indication signal is used to control a dead time from a time when the second switching transistor 403 is turned off to a time when the first switching transistor 402 is turned on.

Figure 14:
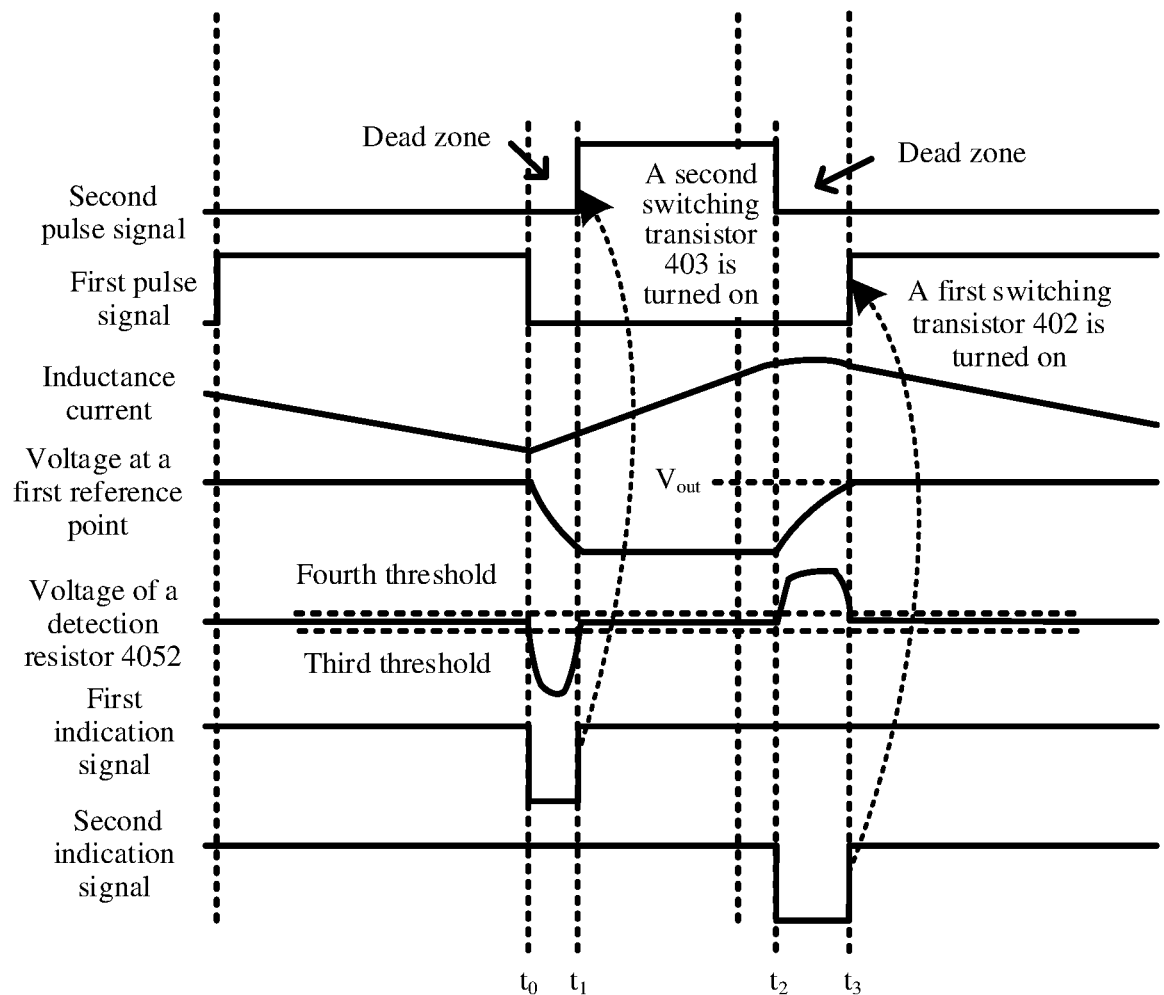
FIG. 14 is a schematic diagram of operating waveforms of a totem-pole PFC circuit.

As shown in FIG. 14, at a moment to, the first switching transistor 402 is turned off, and an inductance current charges the parasitic capacitor of the first switching transistor 402 and discharges the parasitic capacitor of the second switching transistor 403. Therefore, a voltage at the first reference point is decreased. At a moment $t_1$, the first indication signal changes from 0 to 1, and corresponds to a moment at which the voltage at the first reference point is decreased to 0. In this case, the second switching transistor 403 is controlled to be turned on. When the second switching transistor 403 is turned on, a voltage between the drain and the source thereof is 0. This implements zero-voltage switching. At a moment $t_2$, the second switching transistor 403 is turned off, the parasitic capacitor of the first switching transistor 402 is discharged, and the parasitic capacitor of the second switching transistor 403 is charged. Therefore, the voltage at the first reference point is increased. At a moment $t_3$, the second indication signal changes from 0 to 1, and corresponds to a moment at which the voltage at the first reference point is increased to be equal to Vout. In this case, the first switching transistor 402 is controlled to be turned on. When the first switching transistor 402 is turned on, a voltage between the drain and the source thereof is 0. This can implement zero-voltage switching.

Mode 3: The Alternating Current Input Source Inputs a Positive Voltage, and a Frequency of a Pulse Signal is Limited.

Figure 15:
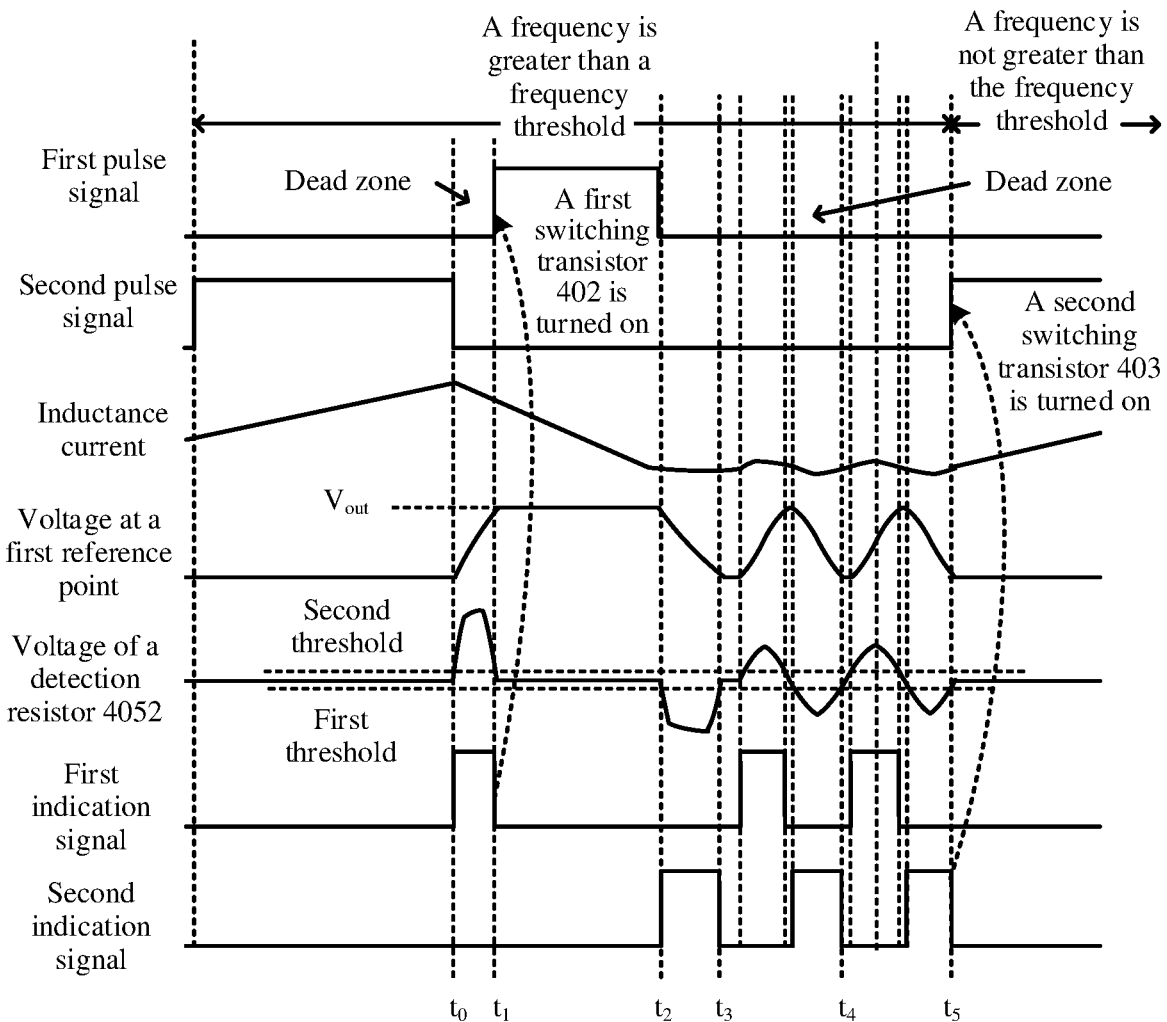
FIG. 15 is a schematic diagram of operating waveforms of a totem-pole PFC circuit.

As shown in FIG. 15, a dead time from a time when the second switching transistor 403 is turned off to a time when the first switching transistor 402 is turned on is controlled in a mode that is the same as Mode 1. Control on a dead time from a time when the first switching transistor 402 is turned off to a time when the second switching transistor 403 is turned on varies due to a frequency limitation on a pulse signal. At a moment $t_2$, the first switching transistor 402 is turned off. Then, at a moment $t_3$, the second indication signal changes from 1 to 0. However, in this case, the frequencies/ frequency of the first pulse signal and/or the second pulse signal are/is greater than a frequency threshold. Therefore, there is a frequency limitation in this case. To reduce a switching loss, the second switching transistor 403 cannot be turned on at the moment $t_3$; and, similarly, the second switching transistor 403 cannot be turned on at a moment $t_4$ either. At a moment $t_5$, the second indication signal changes from 1 to 0 again, and the frequencies/frequency of the first pulse signal and/or the second pulse signal are/is not greater than the frequency threshold. In this case, the second switching transistor 403 is turned on. When the second switching transistor 403 is turned on, a voltage between the drain and the source thereof is 0. This can implement zero-voltage switching.

Mode 4: The Alternating Current Input Source Inputs a Negative Voltage, and a Frequency of a Pulse Signal is Limited.

Figure 16:
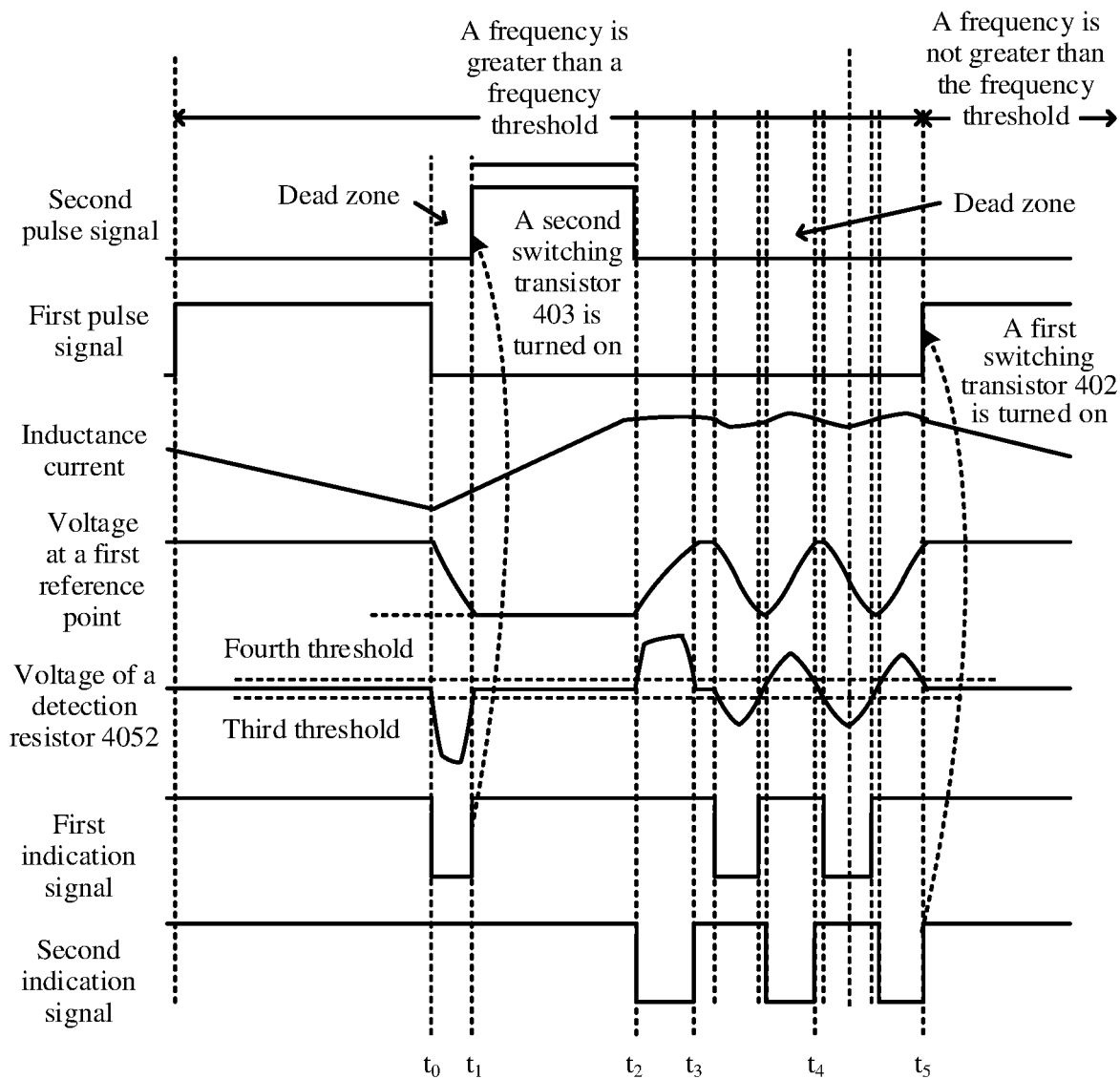
FIG. 16 is a schematic diagram of operating waveforms of a totem-pole PFC circuit.

As shown in FIG. 16, a dead time from a time when the first switching transistor 402 is turned off to a time when the second switching transistor 403 is turned on is controlled in a mode that is the same as Mode 2. Control on a dead time from a time when the second switching transistor 403 is turned off to a time when the first switching transistor 402 is turned on varies due to a frequency limitation on a pulse signal. At a moment $t_2$, the second switching transistor 403 is turned off. Then, at a moment $t_3$, the second indication signal changes from 0 to 1. However, in this case, the frequencies/frequency of the first pulse signal and/or the second pulse signal are/is greater than the frequency threshold. Therefore, there is a frequency limitation in this case. To reduce a switching loss, the first switching transistor 402 cannot be turned on at a moment $t_3$, and similarly the first switching transistor 402 cannot be turned on at a moment $t_4$ either. At a moment $t_5$, the second indication signal changes from 0 to 1 again, and the frequencies/frequency of the first pulse signal and/or the second pulse signal are/is not greater than the frequency threshold. In this case, the first switching transistor 402 is turned on. When the first switching transistor 402 is turned on, a voltage between the drain and the source thereof is 0. This can implement zero-voltage switching.

It should be noted that the control apparatus 401 may further include a power module. The power module is configured to: obtain power from the totem-pole PFC circuit or the alternating current input source, and supply power to the controller 404 and the dead time detection circuit 405 in the control apparatus 401. These are not enumerated one by one in this embodiment.

According to the power supply apparatus provided in this embodiment, the dead time detection circuit may detect the voltage at the first reference point in the totem-pole PFC circuit. The control apparatus may generate a dead time control signal based on the voltage at the first reference point and the voltage polarity of the voltage input into the alternating current input source. The first reference point is a connection point between a source of an upper bridge arm switching transistor and a drain of a lower bridge arm switching transistor in the totem-pole PFC circuit. The control apparatus in the power supply apparatus may control on/off statuses of the upper bridge arm switching transistor and the lower bridge arm switching transistor in the totem-pole PFC circuit based on the dead time control signal. In this way, the power supply apparatus performs optimal control on the totem-pole PFC circuit.

An embodiment further provides a totem-pole PFC circuit control method. A control apparatus is configured to control a totem-pole PFC circuit. The totem-pole PFC circuit includes a first switching transistor and a second switching transistor, a source of the first switching transistor and a drain of the second switching transistor are jointly connected to a first reference point, and a first input end of an alternating current input source is connected to the first reference point through an inductor. The control apparatus includes a controller and a dead time detection circuit, and the dead time detection circuit includes a detection capacitor and a detection resistor. A first end of the detection capacitor is connected to the first reference point, a second end of the detection capacitor is connected to a first end of the detection resistor, and a second end of the detection resistor is grounded. The totem-pole PFC circuit control method is applied to the controller. The method includes: generating a first dead time control signal and a second dead time control signal based on a voltage of the detection resistor and polarity of a voltage input by the alternating current input source; and controlling an on/off status of the first switching transistor based on the first dead time control signal, and controlling an on/off status of the second switching transistor based on the second dead time control signal. By using the method, the totem-pole PFC circuit can be optimally controlled. For an implementation in this embodiment and a corresponding effect thereof, refer to the effect achieved in the foregoing embodiment. Repeated content is not detailed.

A person skilled in the art should understand that the embodiments may be provided as a method, a system, or a computer program product. Therefore, the embodiments may use a form of hardware only embodiments, software only embodiments, or embodiments with a combination of software and hardware. In addition, the embodiments may use a form of a computer program product that is implemented on one or more computer-usable storage media (including, but not limited to, a disk memory, a CD-ROM, an optical memory, and the like) that include computer-usable program code.

The embodiments may be described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a non-transitory computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or another programmable device, so that computer-implemented processing is generated. Therefore, the instructions executed on the computer or another programmable device provide steps for implementing a specific function in one or more procedures in the flowcharts and/or in one or more blocks in the block diagrams.

I may be appreciated that a person skilled in the art can make various modifications and variations to the embodi-

What is claimed is:

1. A power supply apparatus, comprising:
a totem-pole power factor correction (PFC) circuit and a control apparatus, the totem-pole PFC circuit comprises a first switching transistor and a second switching transistor, a source of the first switching transistor and a drain of the second switching transistor are jointly connected to a first reference point, and a first input end of an alternating current input source is connected to the first reference point through an inductor;
the control apparatus comprises a controller and a dead time detection circuit, wherein the dead time detection circuit comprises a detection capacitor and a detection resistor, a first end of the detection capacitor is connected to the first reference point, a second end of the detection capacitor is connected to a first end of the detection resistor, and a second end of the detection resistor is grounded; and
the controller is configured to: generate a first dead time control signal and a second dead time control signal based on a voltage of the detection resistor and polarity of a voltage input by the alternating current input source, control an on/off status of the first switching transistor based on the first dead time control signal, and control an on/off status of the second switching transistor based on the second dead time control signal.

2. The power supply apparatus according to claim 1, wherein the control apparatus further comprises an alternating current input source polarity detection circuit, and the alternating current input source polarity detection circuit is configured to detect the polarity of the voltage input by the alternating current input source.

3. The power supply apparatus according to claim 2, wherein the alternating current input source polarity detection circuit is configured to:
measure a first voltage at the first input end of the alternating current input source and a second voltage at a second input end of the alternating current input source, and calculate a voltage difference between the first voltage and the second voltage;
when the voltage difference is greater than a first preset voltage, determine that the voltage input by the alternating current input source is positive, wherein the first preset voltage is not less than 0; and
when the voltage difference is less than a second preset voltage, determine that the voltage input by the alternating current input source is negative, wherein the second preset voltage is not greater than 0.

4. The power supply apparatus according to claim 1, wherein the control apparatus further comprises a voltage measurement module, and the voltage measurement module is configured to measure the voltage of the detection resistor.

5. The power supply apparatus according to claim 1, wherein the controller is configured to: generate an indication signal based on the voltage of the detection resistor and the polarity of the voltage input by the alternating current input source; and generate the first dead time control signal and the second dead time control signal based on the indication signal and the polarity of the voltage input by the alternating current input source, wherein the indication signal is used to indicate dead zones of the first switching transistor and the second switching transistor, and the indication signal comprises a first indication signal and a second indication signal.

6. The power supply apparatus according to claim 5, wherein, when it is determined that the voltage input by the alternating current input source is positive and that the voltage of the detection resistor is less than a first threshold, the second indication signal is used to indicate that the first switching transistor is in a dead zone;
when it is determined that the voltage input by the alternating current input source is positive and that the voltage of the detection resistor is greater than a second threshold, the first indication signal is used to indicate that the second switching transistor is in a dead zone;
when it is determined that the voltage input by the alternating current input source is negative and that the voltage of the detection resistor is less than a third threshold, the first indication signal is used to indicate that the first switching transistor is in a dead zone; and
when it is determined that the voltage input by the alternating current input source is negative and that the voltage of the detection resistor is greater than a fourth threshold, the second indication signal is used to indicate that the second switching transistor is in a dead zone, wherein the first threshold is less than the second threshold, and the third threshold is less than the fourth threshold.

7. The power supply apparatus according to claim 6, wherein the controller comprises a first multiplexer switch, a second multiplexer switch, a first comparator, a second comparator, and a phase inverter, wherein an output end of the first multiplexer switch is connected to a negative end of the first comparator, and an output end of the second multiplexer switch is connected to a negative end of the second comparator; an output end of the second comparator is connected to the phase inverter, a first input end of the first multiplexer switch is configured to input a voltage of the fourth threshold, and a second input end of the first multiplexer switch is configured to input a voltage of the first threshold; a first input end of the second multiplexer switch is configured to input a voltage of the third threshold, and a second input end of the second multiplexer switch is configured to input a voltage of the second threshold; and a positive end of the first comparator is configured to receive the voltage of the detection resistor, and a positive end of the second comparator is configured to receive the voltage of the detection resistor;
when it is determined that the voltage input by the alternating current input source is negative, the controller controls the first multiplexer switch to establish continuity between the first input end and the output end of the first multiplexer switch, and the controller controls the second multiplexer switch to establish continuity between the first input end and the output end of the second multiplexer switch; and when it is determined that the voltage input by the alternating current input source is positive, the controller controls the first multiplexer switch to establish continuity between the second input end and the output end of the first multiplexer switch, and the controller controls the second multiplexer switch to establish continuity between the second input end and the output end of the second multiplexer switch;
the first comparator is configured to output the first indication signal; and
the phase inverter is configured to output the second indication signal.

8. The power supply apparatus according to claim 5, wherein the controller is configured to:
  when it is determined that the voltage input by the alternating current input source is positive, generate the first dead time control signal based on the first indication signal, and generate the second dead time control signal based on the second indication signal; or
  when it is determined that the voltage input by the alternating current input source is negative, generate the first dead time control signal based on the second indication signal, and generate the second dead time control signal based on the first indication signal.

9. The power supply apparatus according to claim 8, wherein the control apparatus further comprises a first pulse generation circuit, wherein the first pulse generation circuit is configured to generate a first pulse signal and a second pulse signal, the first pulse signal is used to generate the first dead time control signal, and the second pulse signal is used to generate the second dead time control signal; and
  the controller is further configured to: when it is determined that the voltage input by the alternating current input source is positive, generate the first dead time control signal based on the first indication signal and the first pulse signal, and generate the second dead time control signal based on the second indication signal and the second pulse signal; and when it is determined that the voltage input by the alternating current input source is negative, generate the first dead time control signal based on the second indication signal and the first pulse signal, and generate the second dead time control signal based on the first indication signal and the second pulse signal.

10. The power supply apparatus according to claim 9, wherein the control apparatus further comprises a frequency detection module and a switch module;
  the frequency detection module is configured to detect a first signal frequency and a second signal frequency, wherein the first signal frequency is a frequency of the first pulse signal, and the second signal frequency is a frequency of the second pulse signal; and
  the switch module is configured to: control the on/off status of the first switching transistor based on the first signal frequency and control the on/off status of the second switching transistor based on the second signal frequency.

11. The power supply apparatus according to claim 1, wherein the totem-pole PFC circuit further comprises a first diode and a second diode, both a positive electrode of the first diode and a negative electrode of the second diode are connected to the second input end of the alternating current input source through a second reference point, and a positive electrode of the second diode is grounded.

12. The power supply apparatus according to claim 1, wherein the totem-pole PFC circuit further comprises a third switching transistor and a fourth switching transistor, both a source of the third switching transistor and a drain of the fourth switching transistor are connected to the second input end of the alternating current input source through a second reference point, a drain of the third switching transistor is connected to a drain of the first switching transistor, and a source of the fourth switching transistor is grounded;
  the control apparatus further comprises a second pulse generation circuit, wherein the second pulse generation circuit is configured to generate a third pulse signal and a fourth pulse signal; and
  the controller is further configured to: control an on/off status of the third switching transistor based on the third pulse signal and control an on/off status of the fourth switching transistor based on the fourth pulse signal.

13. The power supply apparatus according to claim 1, wherein the control apparatus further comprises a protection circuit, the protection circuit comprises a first voltage regulator tube and a second voltage regulator tube, and the protection circuit is connected in parallel to the detection resistor; and
  a positive electrode of the first voltage regulator tube is connected to a positive electrode of the second voltage regulator tube, and a negative electrode of the second voltage regulator tube is grounded.

14. A totem-pole power factor correction (PFC) circuit control method, wherein a control apparatus is configured to control a totem-pole PFC circuit, the totem-pole PFC circuit comprises a first switching transistor and a second switching transistor, a source of the first switching transistor and a drain of the second switching transistor are jointly connected to a first reference point, and a first input end of an alternating current input source is connected to the first reference point through an inductor; the control apparatus comprises a controller and a dead time detection circuit, wherein the dead time detection circuit comprises a detection capacitor and a detection resistor, a first end of the detection capacitor is connected to the first reference point, a second end of the detection capacitor is connected to a first end of the detection resistor, and a second end of the detection resistor is grounded; and the totem-pole PFC circuit control method is applied to the controller, and the method comprises:
  generating a first dead time control signal and a second dead time control signal based on a voltage of the detection resistor and polarity of a voltage input by the alternating current input source; and
  controlling an on/off status of the first switching transistor based on the first dead time control signal, and controlling an on/off status of the second switching transistor based on the second dead time control signal.

15. The control method according to claim 14, wherein generating the first dead time control signal and the second dead time control signal based on the voltage of the detection resistor and polarity of the voltage input by the alternating current input source comprises:
  generating an indication signal based on the voltage of the detection resistor and the polarity of the voltage input by the alternating current input source; and generating the first dead time control signal and the second dead time control signal based on the indication signal and the polarity of the voltage input by the alternating current input source, wherein the indication signal is used to indicate dead zones of the first switching transistor and the second switching transistor, and the indication signal comprises a first indication signal and a second indication signal.

16. The control method according to claim 15, further comprising:
  when it is determined that the voltage input by the alternating current input source is positive and that the voltage of the detection resistor is less than a first threshold, indicating, with the second indication signal, that the first switching transistor is in a dead zone;
  when it is determined that the voltage input by the alternating current input source is positive and that the voltage of the detection resistor is greater than a second threshold, indicating, with the first indication signal, that the second switching transistor is in a dead zone;

when it is determined that the voltage input by the alternating current input source is negative and that the voltage of the detection resistor is less than a third threshold, indicating, with the first indication signal, that the first switching transistor is in a dead zone; and when it is determined that the voltage input by the alternating current input source is negative and that the voltage of the detection resistor is greater than a fourth threshold, indicating, with the second indication signal, that the second switching transistor is in a dead zone, wherein the first threshold is less than the second threshold, and the third threshold is less than the fourth threshold.

17. The control method according to claim 16, wherein the controller comprises a first multiplexer switch, a second multiplexer switch, a first comparator, a second comparator, and a phase inverter, wherein an output end of the first multiplexer switch is connected to a negative end of the first comparator, and an output end of the second multiplexer switch is connected to a negative end of the second comparator; an output end of the second comparator is connected to the phase inverter, a first input end of the first multiplexer switch is configured to input a voltage of the fourth threshold, and a second input end of the first multiplexer switch is configured to input a voltage of the first threshold; a first input end of the second multiplexer switch is configured to input a voltage of the third threshold, and a second input end of the second multiplexer switch is configured to input a voltage of the second threshold; and a positive end of the first comparator is configured to receive the voltage of the detection resistor, and a positive end of the second comparator is configured to receive the voltage of the detection resistor; the first comparator is configured to output the first indication signal; the phase inverter is configured to output the second indication signal; and the control method further comprises:

when it is determined that the voltage input by the alternating current input source is negative, controlling, with the controller, the first multiplexer switch to establish continuity between the first input end and the output end of the first multiplexer switch, and controlling, with the controller, the second multiplexer switch to establish continuity between the first input end and the output end of the second multiplexer switch; and when it is determined that the voltage input by the alternating current input source is positive, controlling, with the controller, the first multiplexer switch to establish continuity between the second input end and the output end of the first multiplexer switch, and controlling, with the controller, the second multiplexer switch to establish continuity between the second input end and the output end of the second multiplexer switch.

18. The control method according to claim 15, wherein generating the first dead time control signal and the second dead time control signal based on the indication signal and the polarity of the voltage input by the alternating current input source comprises:

when it is determined that the voltage input by the alternating current input source is positive, generating the first dead time control signal based on the first indication signal, and generate the second dead time control signal based on the second indication signal; or when it is determined that the voltage input by the alternating current input source is negative, generating the first dead time control signal based on the second indication signal, and generating the second dead time control signal based on the first indication signal.

19. The control method according to claim 18, wherein the control apparatus further comprises a first pulse generation circuit, wherein the first pulse generation circuit is configured to generate a first pulse signal and a second pulse signal, the first pulse signal is used to generate the first dead time control signal, and the second pulse signal is used to generate the second dead time control signal; and the control method further comprises:

when it is determined that the voltage input by the alternating current input source is positive, generating the first dead time control signal based on the first indication signal and the first pulse signal, and generate the second dead time control signal based on the second indication signal and the second pulse signal; and when it is determined that the voltage input by the alternating current input source is negative, generating the first dead time control signal based on the second indication signal and the first pulse signal, and generating the second dead time control signal based on the first indication signal and the second pulse signal.

* * * * *